US012258641B2

(12) United States Patent
Gabilondo

(10) Patent No.: US 12,258,641 B2
(45) Date of Patent: Mar. 25, 2025

(54) METHOD AND SYSTEM FOR HEATING USING AN ENERGY BEAM

(71) Applicant: ETXE-TAR, S.A., Elgoibar (ES)

(72) Inventor: Jose Juan Gabilondo, Elgoibar (ES)

(73) Assignee: ETXE-TAR, S.A., Elgoibar (ES)

( * ) Notice: Subject to any disclaimer, the term of this patent is extended or adjusted under 35 U.S.C. 154(b) by 776 days.

(21) Appl. No.: 17/418,020

(22) PCT Filed: Dec. 20, 2019

(86) PCT No.: PCT/EP2019/086572
§ 371 (c)(1),
(2) Date: Jun. 24, 2021

(87) PCT Pub. No.: WO2020/136110
PCT Pub. Date: Jul. 2, 2020

(65) Prior Publication Data
US 2022/0088706 A1  Mar. 24, 2022

(30) Foreign Application Priority Data

Dec. 28, 2018 (EP) ..................... 18383004

(51) Int. Cl.
*C21D 1/09* (2006.01)
*B22F 10/28* (2021.01)
(Continued)

(52) U.S. Cl.
CPC ............... *C21D 1/09* (2013.01); *B22F 10/28* (2021.01); *B22F 10/366* (2021.01); *B22F 12/41* (2021.01);
(Continued)

(58) Field of Classification Search
CPC ........ C21D 1/09; B23K 26/082; B23K 26/21; B23K 26/0626; B23K 26/073;
(Continued)

(56) References Cited

U.S. PATENT DOCUMENTS 5,133,987 A * 7/1992 Spence .................. B33Y 30/00
118/620
5,740,330 A * 4/1998 Abe .................... G06K 15/1223
382/199

(Continued)

FOREIGN PATENT DOCUMENTS

CN 103898282 A 7/2014
CN 105132632 A 12/2015
(Continued)

OTHER PUBLICATIONS

Chinese Office Action issued Oct. 26, 2022 for China Application No. 2019800906731, 31 pages, English Translation.
(Continued)

*Primary Examiner* — Thien S Tran
*Assistant Examiner* — Simpson A Chen
(74) *Attorney, Agent, or Firm* — CANTOR COLBURN LLP

(57) ABSTRACT

A method for heat treatment of an object of sheet metal, includes the step of heating at least one selected portion of the object using an energy beam. The beam is projected onto a surface of the object so as to produce a primary spot on the object, the beam being repetitively scanned in two dimensions in accordance with a scanning pattern so as to establish an effective spot on the object, the effective spot having a two-dimensional energy distribution. The effective spot is displaced in relation to the surface of the object to progressively heat the at least one selected portion of the object. The scanning pattern includes interconnected curved segments.

19 Claims, 17 Drawing Sheets

(51) Int. Cl.
*B22F 10/36* (2021.01)
*B22F 10/366* (2021.01)
*B22F 12/41* (2021.01)
*B22F 12/49* (2021.01)
*B23K 26/06* (2014.01)
*B23K 26/073* (2006.01)
*B23K 26/082* (2014.01)
*B23K 26/21* (2014.01)
*B23K 101/00* (2006.01)
*B33Y 10/00* (2015.01)
*B33Y 30/00* (2015.01)
*B33Y 80/00* (2015.01)

(52) U.S. Cl.
CPC .......... *B22F 12/49* (2021.01); *B23K 26/0626* (2013.01); *B23K 26/073* (2013.01); *B23K 26/082* (2015.10); *B23K 26/21* (2015.10); *B22F 10/36* (2021.01); *B23K 2101/006* (2018.08); *B33Y 10/00* (2014.12); *B33Y 30/00* (2014.12); *B33Y 80/00* (2014.12)

(58) Field of Classification Search
CPC .. B23K 2101/006; B33Y 10/00; B33Y 30/00; B33Y 80/00; B22F 12/49; B22F 12/41; B22F 10/28; B22F 10/366; B22F 10/36
USPC ...................................................... 219/121.8
See application file for complete search history.

(56) References Cited

U.S. PATENT DOCUMENTS

| | | | |
|---|---|---|---|
| 10,864,603 B2* | 12/2020 | Sancho Díaz | B23K 26/359 |
| 11,047,019 B2* | 6/2021 | Sancho Díaz | B23K 26/082 |
| 2014/0063472 A1 | 3/2014 | Hung | |
| 2015/0211083 A1 | 7/2015 | Gabilondo et al. | |
| 2017/0022584 A1* | 1/2017 | Domínguez | C21D 1/06 |
| 2017/0173736 A1 | 6/2017 | Gray | |
| 2018/0119238 A1* | 5/2018 | Dajnowski | B23K 26/361 |
| 2018/0141160 A1 | 5/2018 | Karp et al. | |
| 2019/0001442 A1* | 1/2019 | Unrath | B23K 26/082 |

FOREIGN PATENT DOCUMENTS

| | | |
|---|---|---|
| CN | 107921581 A | 4/2018 |
| CN | 108247200 A | 7/2018 |
| CN | 111537979 A | 8/2020 |
| DE | 102007049197 A1 | 4/2009 |
| DE | 102014206302 A1 | 10/2015 |
| EP | 0001889 A1 | 5/1979 |
| EP | 1308525 A2 | 5/2003 |
| JP | H11104877 A | 4/1999 |
| JP | 2005335009 A | 12/2005 |
| WO | 2013167240 A1 | 11/2013 |
| WO | 2014037281 A2 | 3/2014 |
| WO | 2015135715 A1 | 9/2015 |
| WO | 2016026706 A1 | 2/2016 |
| WO | 2016118555 A1 | 7/2016 |
| WO | 2016146646 A1 | 9/2016 |
| WO | 2016180736 A1 | 11/2016 |
| WO | 2018054850 A1 | 3/2018 |

OTHER PUBLICATIONS

Indian Office Action dated Dec. 16, 2022 for Indian Application No. 202137026674, 7 pages.
International Search Report issued Feb. 12, 2020 re: Application No. PCT/EP2019/086572, pp. 1-7, citing: WO 2013/167240 A1, WO 2016/180736 A1, WO 2016/146646 A1, US 2018/0141160 A1, DE 10 2014 206302 A1, JP H11 104877 A, US 2015/0211083 A1, US 2018/0119238 A1, US 2017/0173736 A1 and EP 0 001 889 A1.
Written Opinion issued Feb. 12, 2020 re: Application No. PCT/EP2019/086572, pp. 1-7, citing: WO 2013/167240 A1, WO 2016/180736 A1, WO 2016/146646 A1 and US 2015/0211083 A1.
Chinese Office Action for Chinese Application No. 2019800906731, dated May 30, 2023, 54 pages, English translation.

* cited by examiner

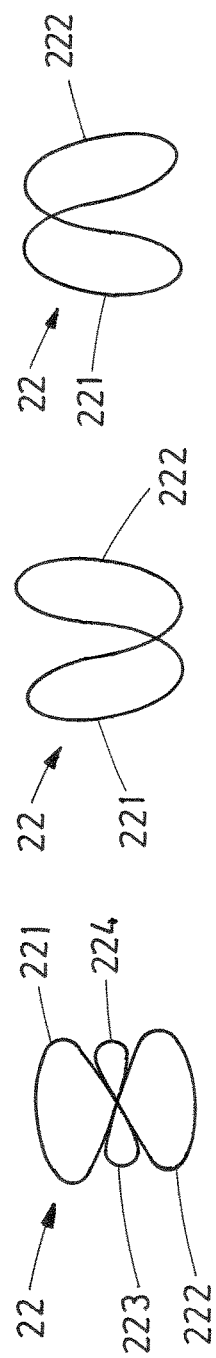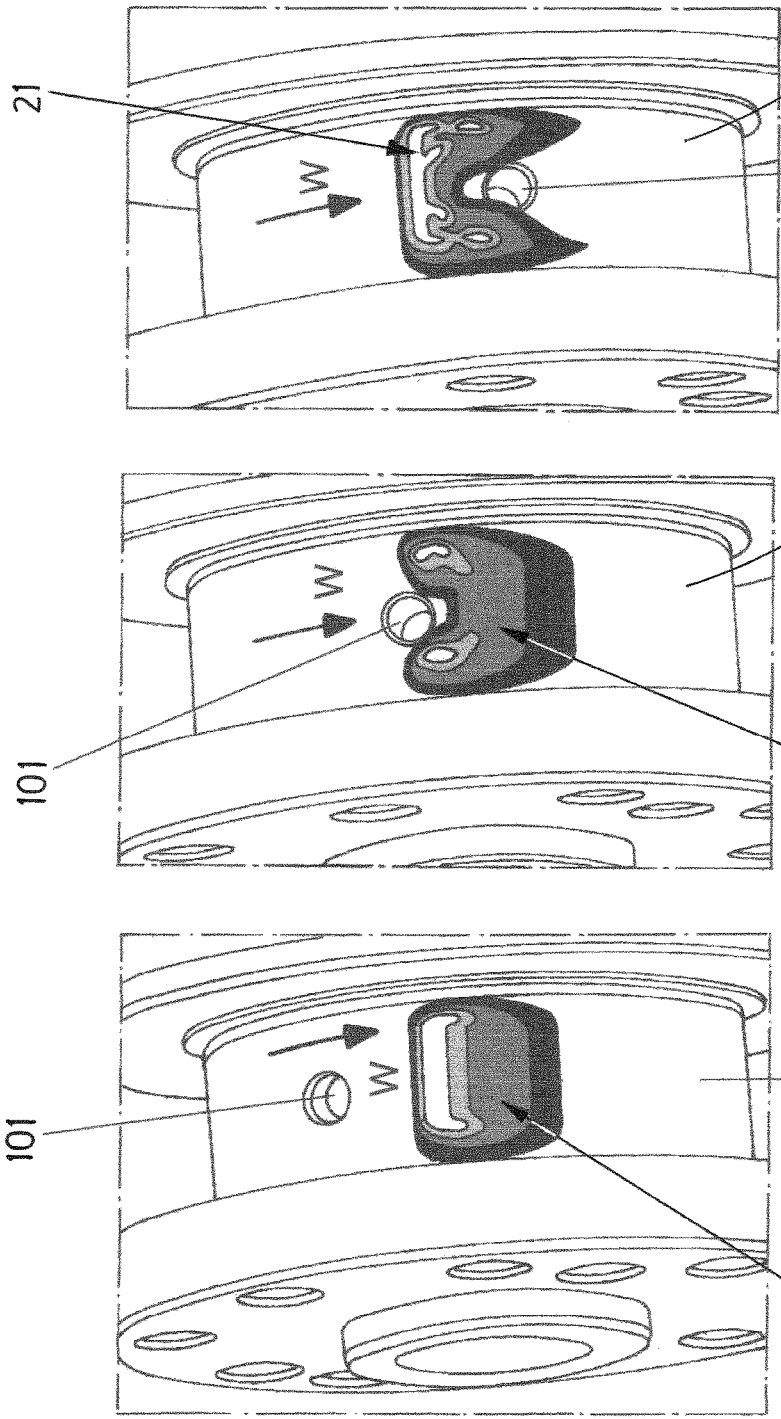
FIG.3A  FIG.3B  FIG.3C

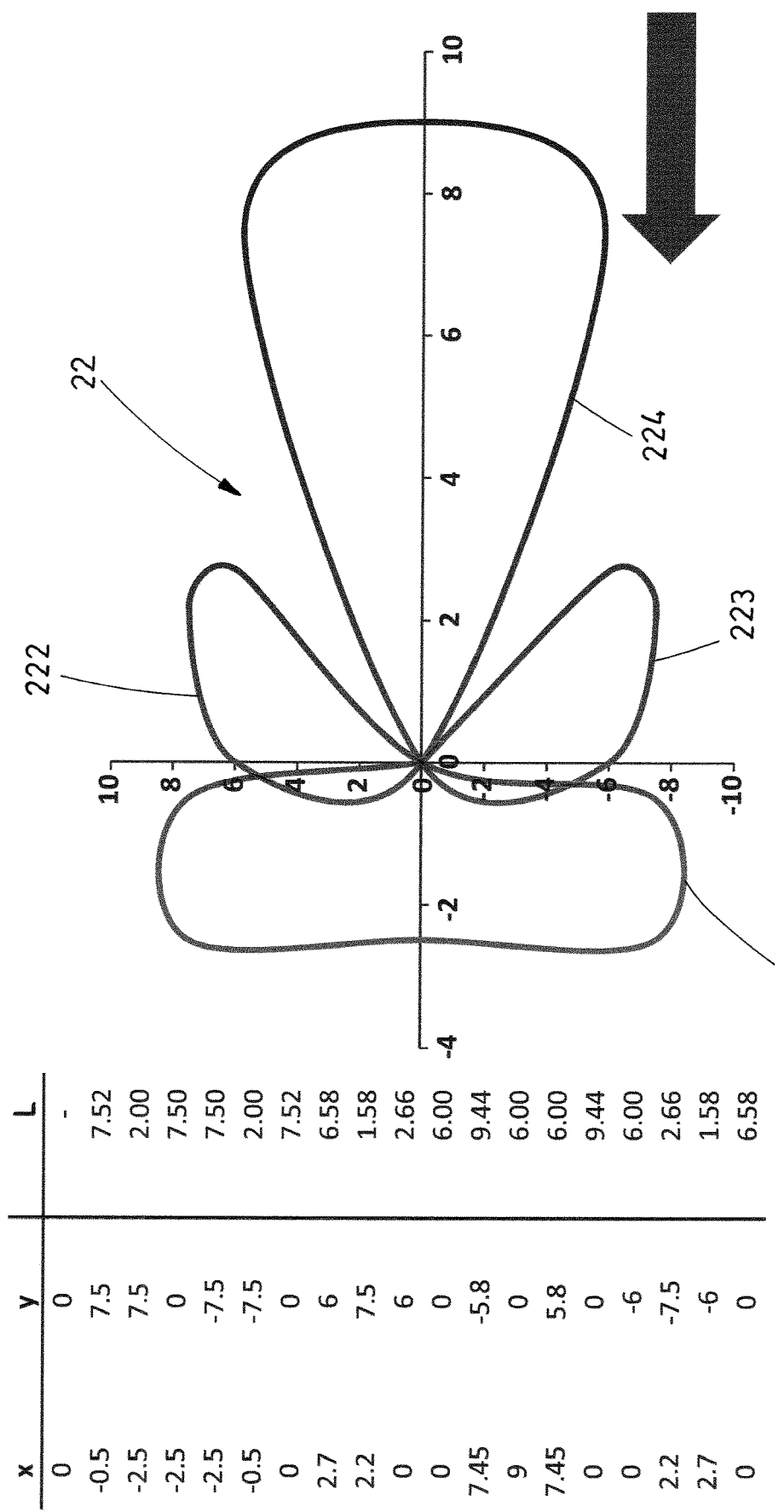

METHOD AND SYSTEM FOR HEATING USING AN ENERGY BEAM

TECHNICAL FIELD

The present disclosure relates to the heating of an object using an energy beam, such as a light beam.

BACKGROUND

It is known in the art to heat objects by directing an energy beam, such as a light beam, for example, a laser beam, onto the object. For example, it is well known in the art to harden ferrous materials, such as steel (for example, medium carbon steel), by heating the material to a high temperature, below its melting temperature, and subsequently quenching it, that is, cooling it rapidly enough to form hard martensite. Heating can take place in furnaces or by induction heating, and cooling can take place by applying a cooling fluid, such as water or water mixed with other components. It is also known to use an energy beam such as a light beam for carrying out certain hardening process, for example, in relation to complex products such as crankshafts. Crankshafts have complex surfaces and very high requirements on the resistance to wear during use. For example, WO-2014/037281-A2 explains how a laser beam can be used for, for example, the hardening of the surfaces of journals of a crankshaft, without producing overheating of the areas adjacent to the oil lubrication holes. Also other objects can be heat treated by methods and systems in line with the ones taught by WO-2014/037281-A2, the contents of which are incorporated herein by reference. WO-2014/037281-A1 discusses, inter alia, how a workpiece can be selectively heated by projecting a beam onto a surface of the workpiece so as to produce a primary spot on the surface, the beam being repetitively scanned in two dimensions in accordance with a scanning pattern so as to establish an effective spot on the surface of the workpiece, this effective spot having a two-dimensional energy distribution. This effective spot is displaced in relation to the surface of the workpiece to progressively heat a selected portion of the workpiece. In some embodiments, the two-dimensional energy distribution of the effective spot is dynamically adapted during displacement of the effective spot in relation to the surface of the workpiece.

WO-2015/135715-A1, the contents of which are incorporated herein by reference, discusses inter alia how, in the context of this kind of technique for laser hardening, different scanning patterns can be used. Illustrated embodiments include scanning patterns with segments that are perpendicular to each other. One illustrated embodiment features a scanning pattern substantially shaped as a "digital 8".

It has been found that the technique for heating using an energy beam as suggested in WO-2014/037281-A1 and WO-2015/135715-A1 can be used for other applications than for hardening of workpieces. For example, WO-2016/026706-A1, the contents of which are incorporated herein by reference, teaches how the technique can be used for additive manufacturing. WO-2016/146646-A1, the contents of which are incorporated by reference, teaches how the technique can be used for heat treatment of sheet metal. Further applications include welding of objects, for example, for joining two or more components of an object, as described in WO-2018/054850-A1, the contents of which are incorporated herein by reference.

The techniques described in the above recited patent applications have been found to involve substantial advantages in terms of flexibility, adaptability, product quality and productivity.

WO-2013/167240-A1 discloses a method and device for laser welding involving a two-dimensional scanning movement of a laser beam overlaid on a basic movement of the beam along the track where the weld seam is to be established.

WO-2016/180736-A1 discloses examples of laser heat treatments involving the use of an effective spot created be scanning of a laser beam.

SUMMARY

The above-mentioned patent applications disclose a variety of scanning patterns, for example, scanning patterns comprising a plurality of parallel lines, and scanning patterns in which the effective spot follows a path involving sudden changes of the direction, corresponding to sharp corners in the pattern, for example, changes in the direction by 90 degrees such as shown in some of the embodiments described and illustrated in WO-2015/135715-A1.

In many practical implementations, the scanning pattern is repeated with a high frequency, such as with a frequency of more than 10 Hz, for example, more than 25 Hz, more than 100 Hz, etc. The scanning can be carried out using scanners which operate by displacing mechanical members, such as mirrors or similar elements, which serve to reflect the beam. For example, laser beams can be scanned using mirrors or similar members that are selectively displaced according to one or more axes by electrically controlled drives. Typically, so-called galvanometric scanners can be used. Now, whereas scanners have improved substantially during the last decades, high scanning speeds still involve difficulties. High repetition rates of scanning patterns involving sudden changes in velocity and/or direction can turn out to be impossible or require very expensive equipment. This can be even more so in industrial applications using high power beams, such as light beams featuring power levels of several kW, requiring the use of relatively heavy mirrors.

Also, even if a scanner theoretically is capable of carrying out a given scanning pattern at a given frequency, the accelerations and decelerations may involve strains and torques that can end up damaging the scanner, especially if the scanning is to be carried out for a substantial amount of time, which is often the case in industrial applications. Also, process errors such as deviations from the pattern to be followed by the beam are more likely to occur if the scanner is driven close to its theoretical dynamic limits. This kind of process errors can have serious consequences on quality and productivity. Thus, in order to make it possible to use a given process industrially, the occurrence of serious process errors must be minimized.

A first aspect of the disclosure relates to a method for heating at least one selected portion of an object, comprising the steps of projecting an energy beam onto a surface of the object so as to produce a primary spot on the surface, and repetitively scanning the beam in two dimensions in accordance with a scanning pattern so as to establish an effective spot on the surface, the effective spot having a two-dimensional energy distribution, displacing the effective spot in relation to the surface of the object to progressively heat the at least one selected portion of the object;

wherein the scanning pattern comprises a plurality of interconnected curved segments.

Thus, contrarily to scanning patterns such as the "digital 8" pattern known from WO-2015/135715-A1, or the pattern with eight straight segments forming a closed loop, each segment forming a sharp corner with the two adjacent segments as known from FIG. 9 of WO-2014/037281-A2, the method of the disclosure uses a scanning pattern that comprises a plurality of curved portions or segments. The curved segments can be interconnected by other curved segments and/or by straight segments.

In the present context, references to the scanning pattern and its shape refer to the two-dimensional scanning pattern followed by the primary spot when projected onto a flat surface (for example, in the x-y-plane) substantially perpendicular to the light beam, rather than to the pattern actually followed by the primary spot on the surface of the object; for example, the surface may include sharp curvatures or bends that will obviously affect the track actually followed by the primary spot in three dimensions. That is, the "scanning pattern" refers to the pattern followed by the beam rather than the pattern actually followed by the primary spot on the physical surface of the object onto which the beam is projected. This distinction is important, because what is primarily relevant in what regards the dynamic limits of the scanner is the scanning of the beam that is carried out by the scanner.

The expression "curved segment" refers to a segment where there is a continuous change in the tangent to the scanning pattern along the scanning pattern, but without any "sharp edges" where the tangent is undefined.

The displacement of the effective spot in relation to the surface of the object can be carried out in accordance with a suitable track. That is, the real/primary spot, that is, the spot that is produced by the beam at any given moment, is scanned in accordance with the scanning pattern to create the effective spot, and this effective spot is displaced in accordance with the track. Thus, two types of movement are combined or overlaid: the movement of the primary spot in accordance with the scanning pattern, and the movement of the effective spot in accordance with the track, which in some embodiments of the disclosure can be a simple straight line and which in other embodiments can feature a more or less complex shape, including one or more curves, for example.

The term "two-dimensional energy distribution" refers to the manner in which the energy applied by the energy beam is distributed over the effective spot, for example, during one sweep of the beam along the scanning pattern. When the effective spot is projected onto a non-planar portion or area, such as a curved portion or area such as a portion or area featuring bends, the term "two-dimensional energy distribution" refers to how the energy is distributed along and across the surface of the object, that is, to the energy distribution along and across the effective spot as projected onto the surface of the object.

The method allows for a relatively rapid heating of a substantial area of the surface of the object, due to the fact that the effective spot can have a substantial size, such as, for example, more than 4, 10, 15, 20 or 25 times the size (area) of the primary spot. Thus, heating a certain region or area of the object to a desired extent in terms of temperature and duration can be accomplished more rapidly than if the heating is carried out by simply displacing the primary spot over the entire area, for example, following a sinusoidal or meandering pattern, or a straight line. The use of an effective spot having a relatively large area allows for high productivity while still allowing the relevant portion or portions of the surface to be heated for a relatively substantial amount of time, thereby allowing for, for example, less aggressive heating without compromising productivity.

The primary spot can have an area substantially smaller than the one of the effective spot. For example, in some embodiments of the disclosure, the primary spot has a size of less than 4 mm$^2$, such as less than 3 mm$^2$, at least during part of the process. The size of the primary spot can be modified during the process, so as to optimize the way in which each specific portion of the object is being heat treated, in terms of quality and productivity.

On the other hand, the use of an effective spot created by scanning the primary spot repetitively in two dimensions in accordance with a scanning pattern, makes it possible to establish an effective spot having a selected two-dimensional energy distribution, which is substantially independent of the specific optics (lenses, mirrors, etc.) being used, and which can be tailored and adapted to provide for an enhanced or optimized heating, from different points of view, including the speed with which the heat treatment is completed (for example, in terms of cm$^2$ per minute or in terms of terminated units per hour), and quality. For example, the heat can be distributed so that a leading portion of the effective spot has a higher energy density than a trailing portion, thereby reducing the time needed to reach a desired temperature of the surface, whereas the trailing portion can serve to maintain the heating for a sufficient amount of time to reach a desired depth and/or quality, thereby optimizing the velocity with which the effective spot can be displaced in relation to the surface of the object, without renouncing on the quality of the heat treatment. Also, the two-dimensional energy distribution can be adapted in relation to the sides of the effective spot, depending on the characteristics of the object, for example, so as to apply less heat in areas adjacent to an edge of the object or an opening in the object, where cooling due to heat transfer is slower, or so as to apply less heat in areas already featuring a relatively high temperature, for example, due to heating that has taken place recently. Also, the effective spot can be adapted in accordance to the tri-dimensional shape of the object, for example, to adapt the heating to the curvature, width, etc., of the object in the area being heated, and to the configuration of the portion of the object that is to be heated. The shape of the effective spot and/or the two-dimensional energy distribution can be adapted whenever needed, thereby adapting the process to the specific part of the object that is to be heated at any given moment. In some embodiments of the disclosure, the two-dimensional energy distribution can be varied as a function of the respective irradiation site on the object, taking into account, for example, the heat removal capability of a surrounding region. In some embodiments of the disclosure, the two-dimensional energy distribution can be varied taking into account desired characteristics of the object in different regions of the product, such as different requirements on hardness, rigidity, softness, ductility, etc.

Additionally, using the effective spot, created by the scanning of the primary spot in two dimensions, increases flexibility in terms of, for example, adaptation of a system to different objects to be produced. For example, the need to replace or adapt the optics involved can be reduced or eliminated. Adaptation can more frequently be carried out, at least in part, by merely adapting the software controlling the scanning of the primary spot and, thereby, the two-dimensional energy distribution of the effective spot.

In many prior art systems for heating an object using an energy beam, the area being heated at each moment substantially corresponded to the primary spot projected by the beam onto the surface. That is, in many prior art arrangements, the area being heated at each moment has a size that substantially corresponds to the one of the primary spot, and the width of the track being heated substantially corresponds to the width of the primary spot in the direction perpendicular to the direction in which the primary spot is being displaced, which in turn is determined by source of the beam and the means for shaping it, for example, in the case of a laser, by the laser source and the optics used. Sometimes, the track is made wider by additionally oscillating the beam, for example, perpendicularly to the track.

Of course, the present disclosure does not exclude the possibility of carrying out part of the heating operating with the primary spot in a conventional way. For example, the primary spot can be displaced to carry out the heating in correspondence with the outline or contour of a region to be heated, or to carry out heating of certain details of the object being heated, whereas the effective spot described above can be used to carry out the heating of other parts or regions of the object, such as the interior or main portion of a region to be heated. The skilled person will chose the extent to which the effective spot rather than the primary spot will be used to carry out the heating, depending on issues such as productivity and the need to carefully tailor the outline of a region to be heated or a certain portion of an object being subjected to heating. For example, it is possible to use the primary spot to outline a region to be heated, while the effective spot is used to heat the surface within the outlined region. In some embodiments of the disclosure, during the process, the scanning pattern can be modified to reduce the size of the effective spot until it ends up corresponding to the primary spot, and vice-versa.

That is, it is not necessary to use the effective spot to carry out all of the heating that has to take place during the process. However, at least part of the process is carried out using the effective spot described above. For example, it can be preferred that during at least 50%, 70%, 80% or 90% of the time during which the beam is applied to the object, it is applied so as to establish the effective spot as explained above, that is, by repetitively scanning the primary spot in accordance with the scanning pattern, this scanning being overlaid on the movement of the effective spot in relation to the object, that is, along the track.

The heating can be for the purpose of any kind of heat treatment, such as surface hardening, welding, solidification, etc. The object can be any suitable kind of object in any suitable form, including powder form or similar, which may often be the case in the context of additive manufacturing. For example, the object can be a sheet metal object, or any other kind of object. The object can be of metal or of any other material. The object does not have to be one single workpiece but can comprise several parts, for example, two or more parts to be welded together by the heating carried out fully or partly by the beam. Thus, the term "object" should not be interpreted in a narrow sense. The surface of the object can include openings or voids. This can, for example, occur when the surface comprises portions relating to different objects, where a space may exist between the objects. This is, for example, frequently the case when two parts are to be welded together, where one of the parts may be spaced from the other part in correspondence with at least part of the interface where a weld seam is to be established. In some embodiments, the surface is flat, whereas in other embodiments it features a three-dimensional shape.

For example, one or more basic scanning pattern layouts can be used as a starting point. Such layouts can be used to define one or more scanning patterns by re-shaping and re-dimensioning the basic layout in accordance with what is desired for a given process. Shaping and dimensioning can for example be carried out by fixing the positions of control points of the selected layout in relation to a co-ordinate system. The two-dimensional energy distribution is further determined by additional parameters such as scanning speed and/or beam power, which in some embodiments of the disclosure can be set differently in relation to different segments of the scanning pattern, for example, segments determined by the control points. Different scanning patterns and/or different parameters such as beam power and scanning speed can be assigned to different portions of the track (to be) followed by the effective spot.

In some embodiments of the disclosure, the tangent to the scanning pattern is defined in correspondence with all points of the scanning pattern. That is, the scanning pattern does not feature any "sharp corners" or "sharp bends", such as in prior art scanning patterns where one straight segment follows another straight segment, as discussed above. Thus, in accordance with these embodiments of the disclosure, there are no such "sharp bends", and this can help to substantially reduce the stresses suffered by the mechanical components of the scanner when operating at high speed.

In some embodiments of the disclosure, the scanning pattern does not comprise any straight segments. For example, the curve can be a spline curve, for example, defined by a set of control points. For example, the curve can be an interpolating curve or an approximating curve defined by these control points. The use of control points for defining the curve can be practical to allow an operator to define a desired energy distribution for the effective spot, taking features of the object into account. As explained above, a basic pattern layout can be re-shaped and re-dimensioned using this kind of control points.

In some embodiments of the disclosure, the scanning pattern comprises curved and straight segments, and the total length of all curved segments is larger than the total length of all straight segments. That is, the sum of the length of all curved segments is larger than the sum of the length of all straight segments, there being at least one curved and one straight segment. It has been found that a substantial amount of curved segments can be useful for establishing a pattern providing for adequate surface coverage while minimizing the abrupt changes in the movement of the components of the scanner. Now, sometimes straight segments can be useful for interconnecting the curved segments.

In some embodiments of the disclosure, the scanning pattern comprises at least one point where one segment of the scanning pattern crosses another segment of the scanning pattern. It has been found that this kind of involved scanning patterns, with one or more segments crossing one or more other segments, can be helpful for achieving a desired and complex two-dimensional energy distribution, without any need for sudden and abrupt changes of direction of the beam movement during scanning.

In some embodiments of the disclosure, in correspondence with at least one first segment that crosses another segment, the velocity of movement of the beam along the first segment is higher at a first point where the first segment crosses the other segment, than at a second point remote from the first point. If the velocity of the movement of the beam is constant all throughout the scanning pattern, more heat may be applied where beams cross each other or pass close to each other. If this is not desired, the velocity of the movement of the beam along the scanning pattern can be modulated, so as to tailor the two-dimensional energy distribution and avoid an excessive application of energy in certain positions where segments of the scanning pattern cross each other or pass close to each other.

In some embodiments of the disclosure, the scanning pattern comprises a plurality of lobes, such as two, three, four or more lobes. It has been found that the use of a scanning pattern with a number of lobes featuring a curved shape can be useful for achieving a flexibly determinable energy distribution without any sharp changes in the trajectory of the beam along the scanning pattern. In some embodiments one or more of the lobes, such as all of the lobes, are closed in the sense that the respective lobe is defined by a portion of the scanning pattern that completely surrounds an area. The use of curved lobes has been found suitable for providing an effective spot effectively heating a relatively large area while requiring a relatively short overall length of the scanning pattern, that is, of the path followed by the primary spot during one sweep along the scanning pattern. The outline of each lobe preferably surrounds at least one point within the lobe by more than 180°, more preferably by more than 270°, such as by more than 300°, for example, by more than 330°.

This does not mean that the scanning pattern has to feature lobes during the entire heat treatment process: however, in these embodiments, the lobes referred to above have to be present during at least part of the process, such as during 10%, 50%, 90% or more of the duration of the process.

In some embodiments of the disclosure, the scanning pattern comprises at least three lobes, such as at least four, five, or six lobes.

In some embodiments of the disclosure, the number of lobes and/or the shape of the lobes is varied while the effective spot is displaced in relation to the surface of the object. Modifying the number of lobes and/or the shape of the lobes can serve to adapt the two-dimensional energy distribution to variations in the object along the track followed by the effective spot, for example, to accommodate openings, voids, more heat sensitive sub-portions, portions that require a higher input of energy, etc.

In some embodiments of the disclosure, the scanning pattern comprises a spline curve. A spline curve is a mathematical representation that allows a user to design and control the shape of curves, including relatively complex curves, via an interface. A user can for example define a series of points via an interface, and a computer device can then construct a curve that follows the series of points, often referred to as control points. Sometimes a curve that passes through the control points is referred to as an "interpolating curve", whereas a curve that passes near to the control points but not necessarily through them is referred to as an "approximating curve". It has been found that this approach allows users to design appropriate scanning patterns by selecting points on a two-dimensional plane. A smooth curve without any sharp corners can then be established using suitable computer software, for example.

Thus, the use of spline curves can facilitate the creation of suitable scanner-friendly scanning patterns, including asymmetric scanning patterns.

In some embodiments of the disclosure, the two-dimensional energy distribution of the effective spot is dynamically adapted during displacement of the effective spot in relation to the surface of the object. Thereby, adaptation of the effective spot to the area or region of the object currently being heated can be accomplished. The expression dynamic adaptation is intended to denote the fact that adaptation can take place dynamically during displacement of the effective spot. Different means can be used to achieve this kind of dynamic adaptation, some of which are mentioned below. For example, in some embodiments of the disclosure, the scanning system can be operated to achieve the dynamic adaptation (for example, by adapting the operation of galvanic mirrors or other scanning means, so as to modify the scanning pattern and/or the velocity of the primary spot along the scanning pattern or along one or more segments or portions thereof), and/or the beam power and/or the size of the primary spot can be adapted. Open-loop or closed-loop control can be used for controlling the dynamic adaptation. The dynamic adaptation can affect the way in which the energy is distributed within a given area of the effective spot, and/or the actual shape of the effective laser spot, and thus the shape of the area being heated at any given moment (disregarding the fact that the primary spot is moving, and just considering the effective spot). For example, the length and/or the width of the effective spot can be adapted dynamically during the process. Thus, by this dynamic adaptation, the two-dimensional energy distribution can be different in relation to different portions of the surface of the object.

In some embodiments of the disclosure, adaptation of the two-dimensional energy distribution of the effective spot (21) is carried out by, for example:

Adapting the power of the beam (2), such as by selectively turning the beam on and off (this includes interruption of the beam at its source, as well as other options such as interruption of the beam by interference with the path of the beam, for example with a shutter, and combinations thereof. For example, when using a laser such as a fiber laser, the laser beam can be switched on and off very rapidly, thus making it possible to obtain a desired energy distribution by turning the laser beam on and off while following the scanning pattern. Thus, heating can be achieved by turning the laser beam on during certain lines or parts of lines of the scanning pattern. For example, a pixelized approach can be adopted, according to which the two-dimensional energy distribution is determined by the on/off state of the laser during the different portions or segments of the scanning pattern.

And/or

Adapting the scanning pattern, for example, by adapting its size and/or shape, for example, by changing the shape of lobes and/or the number of lobes thereof, just to give some examples.

And/or

By adapting the velocity with which the primary spot moves along at least a portion of the scanning pattern.

That is, the two-dimensional energy distribution can be adapted by adapting, for example, the power of the beam—for example, by switching between different power states such as between on and off-, and/or by adapting the scanning pattern—for example, adding or leaving out segments, or modifying the orientation of segments, or completely changing a pattern for another one-, and/or by adapting the velocity with which the beam moves along the scanning pattern, such as along one or more segments thereof. The choice between different means for adapting the two-dimensional energy distribution can be made based on circumstances such as the capacity of the equipment to rapidly change between power states of the beam, and on the capacity of the scanner to modify the pattern to be followed and/or the speed with which the primary spot moves along the scanning pattern.

In some embodiments of the disclosure, the beam is displaced along said scanning pattern without switching the beam on and off and/or while maintaining the power of the beam substantially constant. This makes it possible to carry out the scanning at a high speed without taking into account the capacity of the equipment, such as a laser equipment, to switch between different power levels, such as between on and off, and it makes it possible to use equipment that may not allow for very rapid switching between power levels. Also, it provides for efficient use of the available output power, that is, of the capacity of the equipment in terms of power. Thus, adaptation of scanning speed and/or scanning pattern can often be preferred over adaptation of beam power.

In some embodiments of the disclosure, focus of the beam and/or the size of the primary spot are dynamically adapted during displacement of the primary spot along the scanning pattern and/or during displacement of the effective spot in relation to the surface of the object. In some embodiments of the disclosure, focus of the beam is dynamically adapted during displacement of the primary spot along the scanning pattern and/or during displacement of the effective spot in relation to the object. For example, when a laser beam is used, the laser focus along the optical axis can be dynamically modified during the process, for example, so as to vary or maintain the size of the primary laser spot while it is being displaced along the scanning pattern, and/or while the effective laser spot is being displaced in relation to the surface of the object. For example, the optical focus can be adapted to keep the size of the primary spot constant while the primary spot is moving over the surface of the object (for example, to compensate for varying distances between the laser source or the scanner and the position of the primary laser spot on the surface of the object).

In some embodiments of the disclosure, the size of the primary spot is dynamically adapted during displacement of the primary spot along the scanning pattern and/or during displacement of the effective spot in relation to the surface of the object, so as to modify the two-dimensional energy distribution and/or the size of the effective spot.

In some embodiments, during at least one stage of the method,
  the effective spot comprises a leading portion having a higher energy density than a trailing portion of the effective spot,
  or
  the effective spot comprises a leading portion having a lower energy density than a trailing portion of the effective spot,
  or
  the effective spot comprises an intermediate portion having a higher energy density than a leading portion and a trailing portion of the effective spot,
  or
  the effective spot features a substantially constant energy density throughout the effective spot.

In some embodiments of the disclosure, the method comprises the steps of, prior to projecting the energy beam onto a surface of the object:
  a) establishing a plurality of scanning patterns; and
  b) assigning different ones of said scanning patterns to different portions of a track to be followed by the effective spot on the surface of the object;
  wherein the step of displacing the effective spot in relation to the surface of the object to progressively heat the at least one selected portion of the object comprises displacing the effective spot along the track and changing the scanning pattern so that, at each portion of the track, the effective spot is produced by the beam following the scanning pattern assigned to the respective portion of the track.

In some embodiments of the disclosure, at least one scanning pattern is established by:
  specifying a plurality of control points;
  establishing a scanning pattern in the form of a spline curve defined by the control points;
  optionally, assigning different parameter values to different portions of the curve, the parameter values being indicative of laser power and/or scanning velocity in relation to the respective portions of the curve.

In some embodiments of the disclosure, the primary spot is displaced on the surface of the object in accordance with the scanning pattern with a first average velocity, and wherein the effective spot is displaced in relation to the surface of the object with a second average velocity, the first average velocity being substantially higher than the second average velocity, such as at least 5, 10, 50 or 100 times the second average velocity. Here, the term "first average velocity" refers to the length of the scanning pattern projected onto the surface of the object divided by the time needed for the primary spot to complete one sweep along the scanning pattern, whereas the term "second average velocity" refers to the length of the track followed by the effective spot on the surface divided by the time needed for the effective spot to complete the track. A high velocity of the primary spot along the scanning pattern reduces the temperature fluctuations within the effective spot during each sweep of the primary spot along the scanning pattern. This is a conceptual difference if compared to prior art arrangements such as the one known from WO-2016/118555-A1, disclosing laser welding using a laser beam with scanning in two dimensions overlaid on a basic relative movement along the workpiece. Although WO-2016/118555-A1 refers to a "figure 8 pattern", this FIG. 8 pattern does not correspond to a scanning pattern as per the present disclosure, as the relative movement between laser source and surface is carried out with a velocity of the same or similar magnitude as the velocity of the primary spot in accordance with the "figure 8 pattern", as evidenced by for example FIG. 3 and the related portions of the description. That is, no effective spot is established, but the primary spot rather follows a general path while drawing some kind of lobes on both sides of the general path.

Additionally, or alternatively, the beam is scanned in accordance with the scanning pattern so that the scanning pattern is repeated by the beam with a frequency of more than 10 Hz, preferably more than 25 Hz, more preferably more than 100 Hz. In some embodiments of the disclosure, the beam is scanned in accordance with the scanning pattern so that the scanning pattern is repeated by the beam with a frequency of more than 10, 25, 50, 75, 100, 150, 200 or 300 Hz (i.e., repetitions of the scanning pattern per second). A high repetition rate can be appropriate to reduce or prevent non-desired temperature fluctuations in the areas being heated by the effective spot, between each scanning cycle, that is, between each sweep of the beam along the scanning pattern. In some embodiments of the disclosure, the scanning pattern remains constant, and in other embodiments of the disclosure, the scanning pattern is modified between some or all of the sweeps of the beam along the scanning pattern.

Additionally or alternatively, the size of the effective spot is more than 4 times the size of the primary spot, preferably more than 10 times the size of the primary spot, more preferably at least 25 times the size of the primary spot. In some embodiments of the disclosure, the size (that is, the area) of the effective spot, such as the average size of the effective spot during the process or the size of the effective spot during at least one moment of the process, such as the maximum size of the effective spot during the process, is more than 4, 10, 15, 20 or 25 times the size of the primary spot. For example, in some embodiments of the disclosure, a primary spot having a size in the order of 3 mm$^2$ can be used to create an effective spot having a size of more than 10 mm$^2$, such as more than 50 or 100 mm$^2$ or more. The size of the effective spot can be dynamically modified during the process, but a large average size can often be preferred to enhance productivity, and a large maximum size can be useful to enhance productivity during at least part of the process.

The method can be carried out under the control of electronic control means, such as a computer.

In some embodiments of the disclosure, the energy beam is a laser beam. A laser beam is often preferred due to issues such as cost, reliability, and availability of appropriate scanning systems. In some embodiments of the disclosure, the power of the laser beam is higher than 1 kW, such as higher than 3 kW, higher than 4 kW, higher than 5 kW or higher than 6 kW, at least during part of the process. Traditionally, when a primary laser spot is scanned to progressively heat the region to be heat treated, lasers having relatively low output powers have often been used. For example, EP-1308525-A2 suggests a beam power of 600 W. This is because in this prior art reference, the laser spot that at a certain moment is heating a surface portion corresponds to the primary spot, having a relatively small surface area. Thus, a lower power output can be preferred to avoid overheating. In accordance with the disclosure, the power of the laser can be distributed over an effective laser spot having a surface area substantially larger than the one of the primary laser spot. That is, with the present approach, based on the creation of a larger effective laser spot, higher powers can be used, whereby the productivity can be enhanced.

In some embodiments of the disclosure, the two-dimensional energy distribution of the effective spot is dynamically adapted during displacement of the effective spot in relation to the surface of the object, in response to at least one change in angle between the energy beam and a portion of the surface of the object being heated by the effective spot, and/or in relation to at least one change in direction of a track followed by the primary spot, for example, for adapting the two-dimensional energy distribution, including the shape and the size of the effective spot as well as the two-dimensional energy distribution within the effective spot, to the curvature and/or bends in the surface, and/or to variations in the angle at which the surface is oriented in relation to the scanner, and/or to variations in the direction followed by the primary spot, for example, as the result of a curve or bend in the track.

In some embodiments of the disclosure, at least one of the power of the energy beam, the scanning pattern and the velocity with which the primary spot moves along at least a portion of the scanning pattern, is/are adapted in response to at least one change in angle between the energy beam and a portion of the surface of the object being heated by the effective spot, and/or to at least one change in the trajectory of the track.

Thus, the teachings of the present disclosure can be used to adequately control the heating when the effective spot moves over a curved surface, over a bent portion of the object, or when the effective spot moves from a first portion or region of the object to another portion or region placed at an angle with the first portion or region, etc. This can be very useful in order to, for example, assure a good quality of the heating, when the object being heated is an object that has previously been shaped (for example, hot-formed) in for example a press, so that the surface features a more or less complex shape with curves and/or bends, etc. This is often the case with, for example, sheet metal vehicle components. Similarly, the effective spot can "turn" according to the direction of a track, for example, so that a leading edge with higher energy density will remain at the head of the effective spot also during and after a curve in the track followed by the effective spot. In some embodiments, the track is a welding track following an interface area where two components are to be joined to each other.

A further aspect of the disclosure relates to a system for heating at least one selected portion of an object, the system comprising means for supporting an object, and means for producing an energy beam and for projecting the energy beam onto a surface of the object.

The system comprises a scanner for scanning the energy beam in at least two dimensions. The system is arranged, such as programmed, for carrying out the method as described above. In some embodiments of the disclosure, the system includes means for producing a relative movement between the scanner and the object, by displacing the scanner and/or the object.

A further aspect of the disclosure relates to a method of programming a system including means for producing an energy beam and a scanner for scanning the energy beam in at least two dimensions. In some embodiments the system is a system as described above, suitable and adapted for carrying out a method as described above. The method of programming comprises the steps of:

programming the system so as to instruct the scanner to scan the energy beam according to a first scanning pattern;

detecting data indicative of a second scanning pattern different from the first scanning pattern, the second scanning pattern being a scanning pattern followed by the energy beam when the system is operating as programmed;

reprogramming the system based on the data indicative of the second scanning pattern, for example, so as to instruct the scanner to operate more in accordance with the second scanning pattern. In some embodiments the scanner is a galvanometric scanner. In some embodiments the scanner comprises two or more scanning mirrors or other reflecting elements configured to deflect the energy beam. The data indicative of the second scanning pattern can, for example, comprise data originating from encoders of the scanner, for example, encoders indicative of the real movements of the mirrors or similar of the scanner.

Thus, in accordance with the method the system including the scanner can end up being programmed in a manner that better reflects the actual operation of the scanner. Thereby, the scanner can be subjected to less operational stress when operated. This serves to minimize the risk of damage to the scanner or to operational failures of the type that tend to appear when a scanner is operated at its operational limits, for example, forced to follow a scanning pattern including abrupt changes at a high speed. The steps of detecting data indicative of a scanning pattern followed by the energy beam and reprogramming the system/scanner can be repeated as often as deemed possible, so as to ensure that the system with scanner ends up being programmed in a manner that substantially coincides with its actual operation, thereby minimizing the operational stresses. It has been found that this manner of programming a system can be fully compatible with the methods of heating as described above or at least with some of them, including the operation with a plurality of lobes. The expression "instruct the scanner to operate more in accordance with the second scanning pattern" is intended to denote that the new instructions to the scanner better correspond to the actual operation of the scanner than the original instructions.

BRIEF DESCRIPTION OF THE DRAWINGS

To complete the description and in order to provide for a better understanding of the disclosure, a set of drawings is provided. Said drawings form an integral part of the description and illustrate embodiments of the disclosure, which should not be interpreted as restricting the scope of the disclosure, but just as examples of how the disclosure can be carried out. The drawings comprise the following figures:

FIGS. 3A-3C schematically illustrate how the energy distribution of an effective laser spot can be adapted when hardening the area around an oil lubrication hole.

FIG. 9 illustrates one example of a scanning pattern that can be used in accordance with some embodiments of the disclosure.

DETAILED DESCRIPTION OF THE DRAWINGS

Figure 1A:
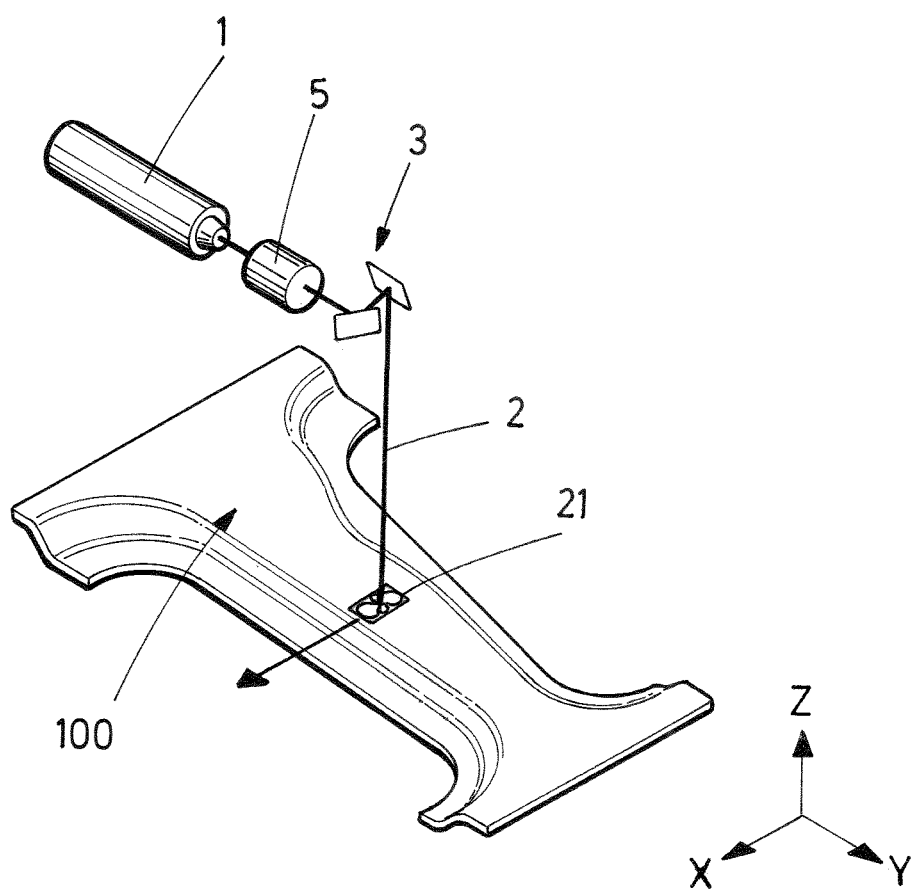
FIG. 1A is a schematic perspective view of a system in accordance with one possible embodiment of the disclosure.

FIG. 1A schematically illustrates a system in accordance with one possible embodiment of the disclosure, in this case for heat treatment of a sheet metal object such as a pillar for a vehicle. The system comprises a laser equipment 1 for producing a laser beam 2, and a scanner 3 including two mirrors or similar for two-dimensional scanning of the laser beam 2 in the horizontal (X-Y) plane. The equipment for producing a laser beam can, in some embodiments of the disclosure, be an equipment suitable for producing laser beams having a relatively high power content, such as 1 kW or more. One example of a suitable device is the Ytterbium Laser System Model YLS-6000-CT, by IPG Photonics, with a nominal power of 6 kW.

The system further comprises means (not shown in FIG. 1A) for holding or supporting a workpiece 100; in the illustrated embodiment, the workpiece is for a vehicle body pillar, such as a so-called center pillar. The pillar or pillar workpiece can, for example, be a workpiece with very high hardness, obtained by hot-pressing a sheet metal template to give it the desired shape, followed by cooling the workpiece to produce quenching, as known in the art. The laser beam 2 is projected onto the workpiece in a region where it is desired to provide for reduced hardness, for example, to establish an area where deformation is preferably to take place in the case of an impact.

Traditionally, this was sometimes carried out by basically sweeping a laser beam, having a certain width, once over the area where reduced hardness was desired, typically corresponding to a strip or band across the pillar. However, in accordance with the present embodiment of the disclosure, the laser beam (and the primary laser spot that the beam projects on the workpiece) is repetitively scanned at a relatively high speed following a scanning pattern with a plurality of lobes schematically illustrated in FIG. 1A, thereby creating an effective spot 21, illustrated as a square in FIG. 1A. This is achieved using the scanner 3. This effective spot 21 is displaced in relation to the surface of the workpiece 100 in accordance with a predetermined track, for example, across the pillar; in FIG. 1A, an arrow indicates how the effective spot 21 can, for example, be displaced in parallel with the X axis of the system relative to the surface of the workpiece.

The displacement of the effective spot 21 according to the track can likewise be achieved by the scanner 3, and/or due to displacement of the scanner or associated equipment, for example, along tracks (not shown in FIG. 1A), such as tracks extending in parallel with the X axis and/or the Y axis. It can also be achieved by displacing the workpiece 100 in relation to the position of the scanner, or by a combination of these means for displacement.

The effective spot and its two-dimensional energy distribution can be dynamically adapted during the displacement of the effective spot along the track. For example, considering FIG. 1A, the width of the effective spot (along the Y axis) can be adapted during its displacement across the workpiece, so that the width of the track subjected to heat treatment varies across the workpiece. Also other features of the effective spot can be adapted, so as to optimize the heat treatment, for example, the establishment of an area where the hardness is reduced so as to provide for a desired performance of the workpiece (for example, in the case of a structural component for a vehicle, so as to provide for a desired performance in terms of bending following an impact).

Figure 1B:
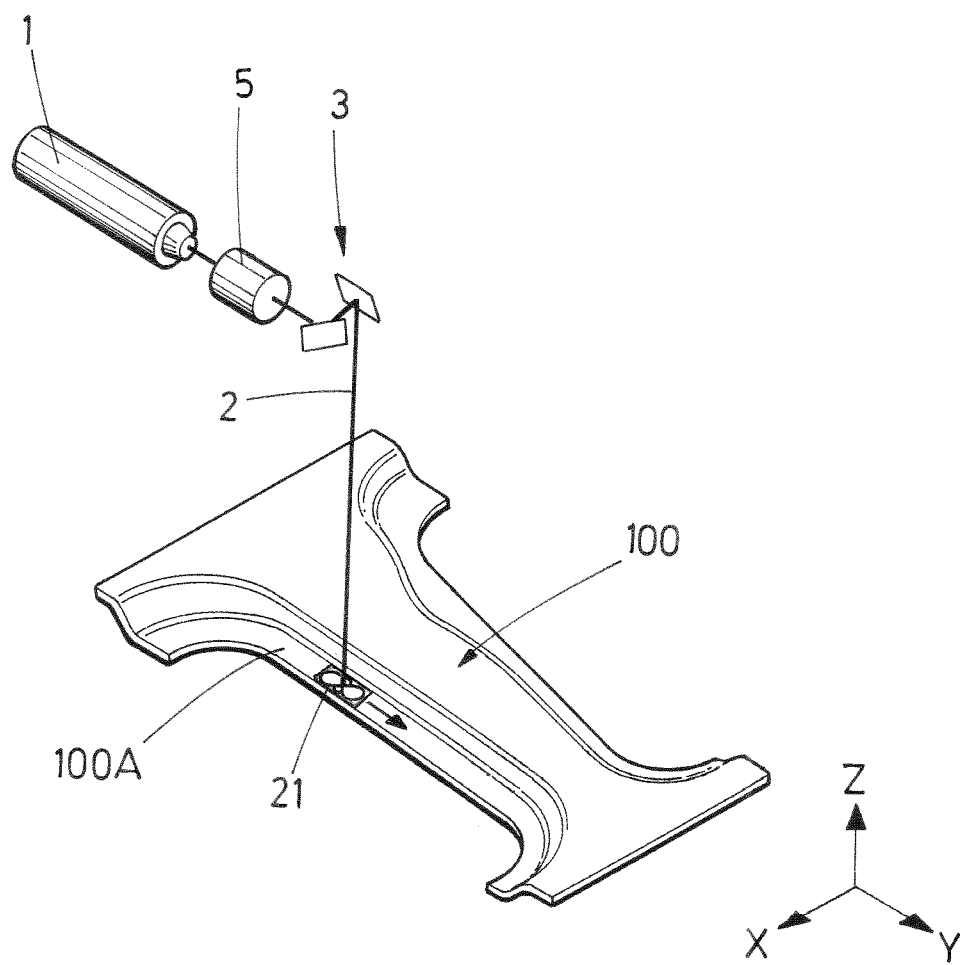
FIGS. 1B-1F schematically illustrate the system of FIG. 1A during heat treatment of different portions of a workpiece.
Figure 1C:
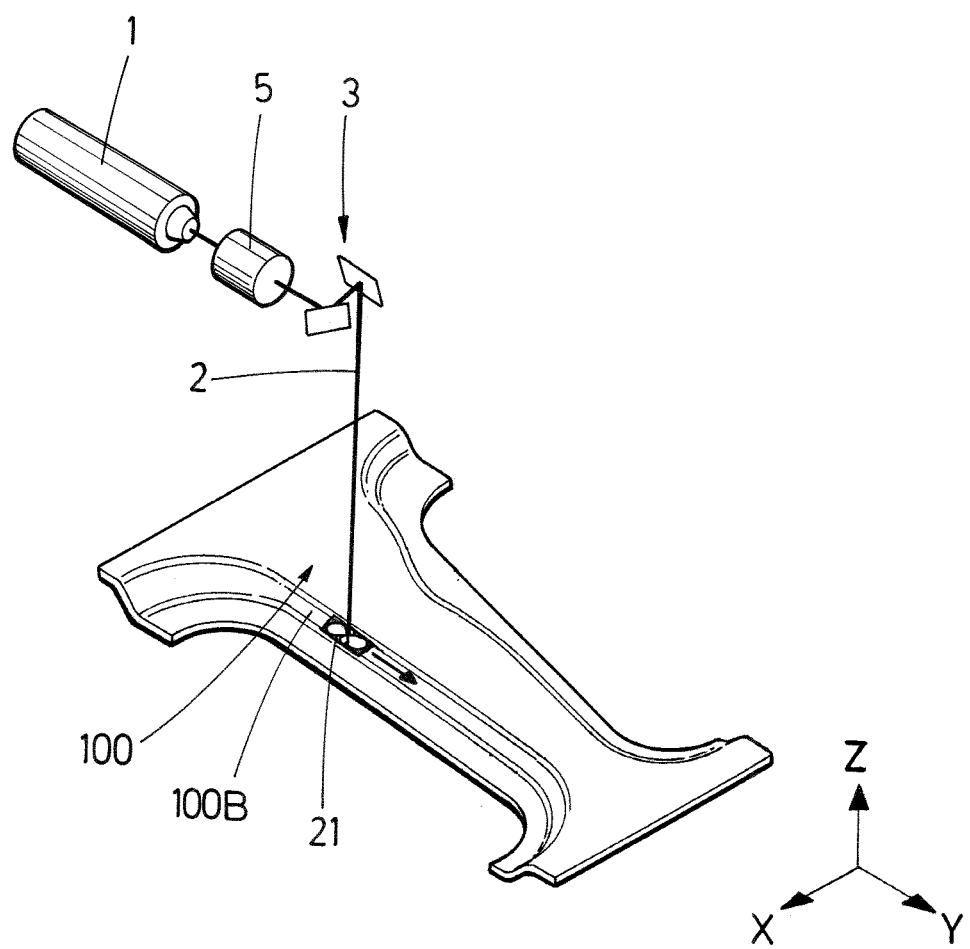
Figure 1D:
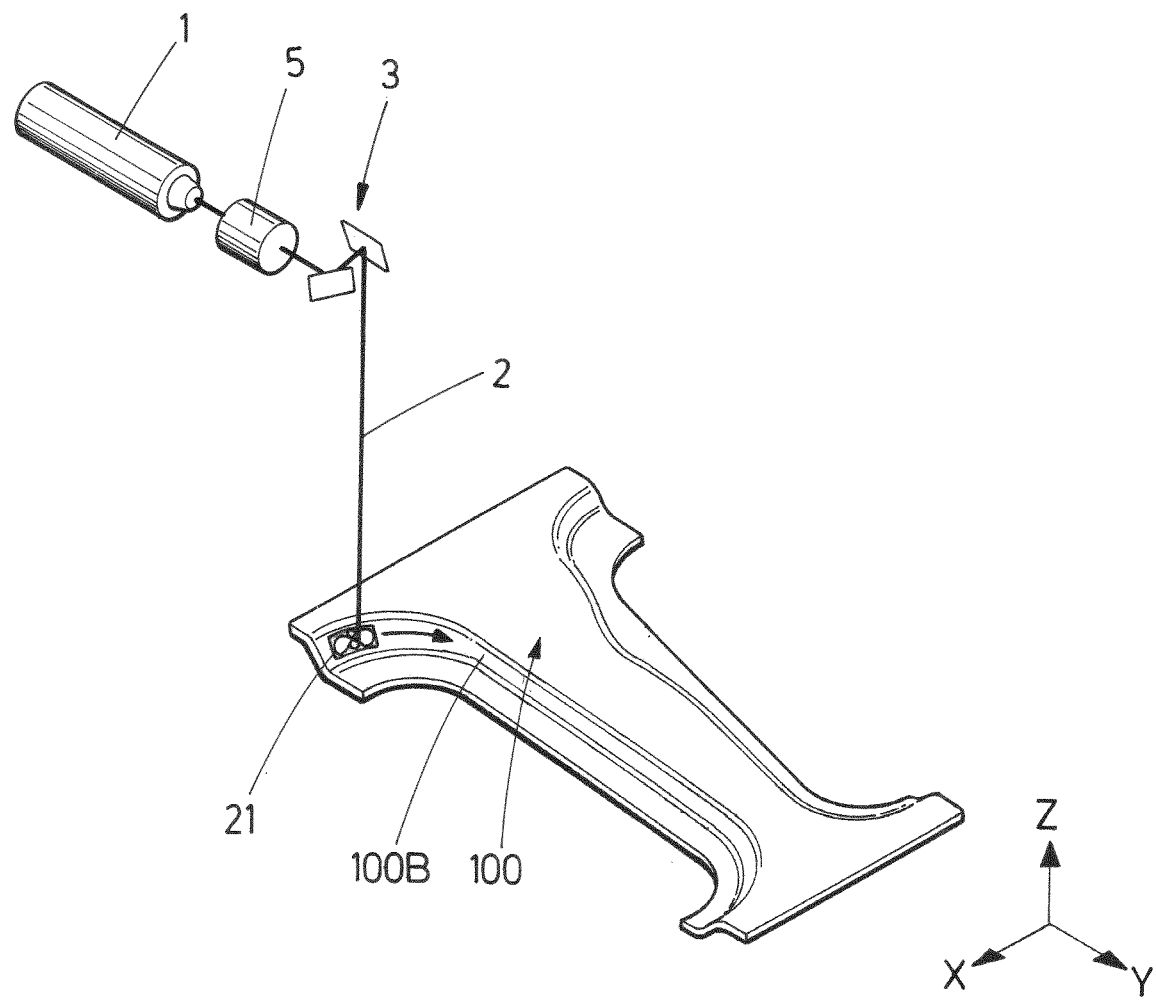
Figure 1E:
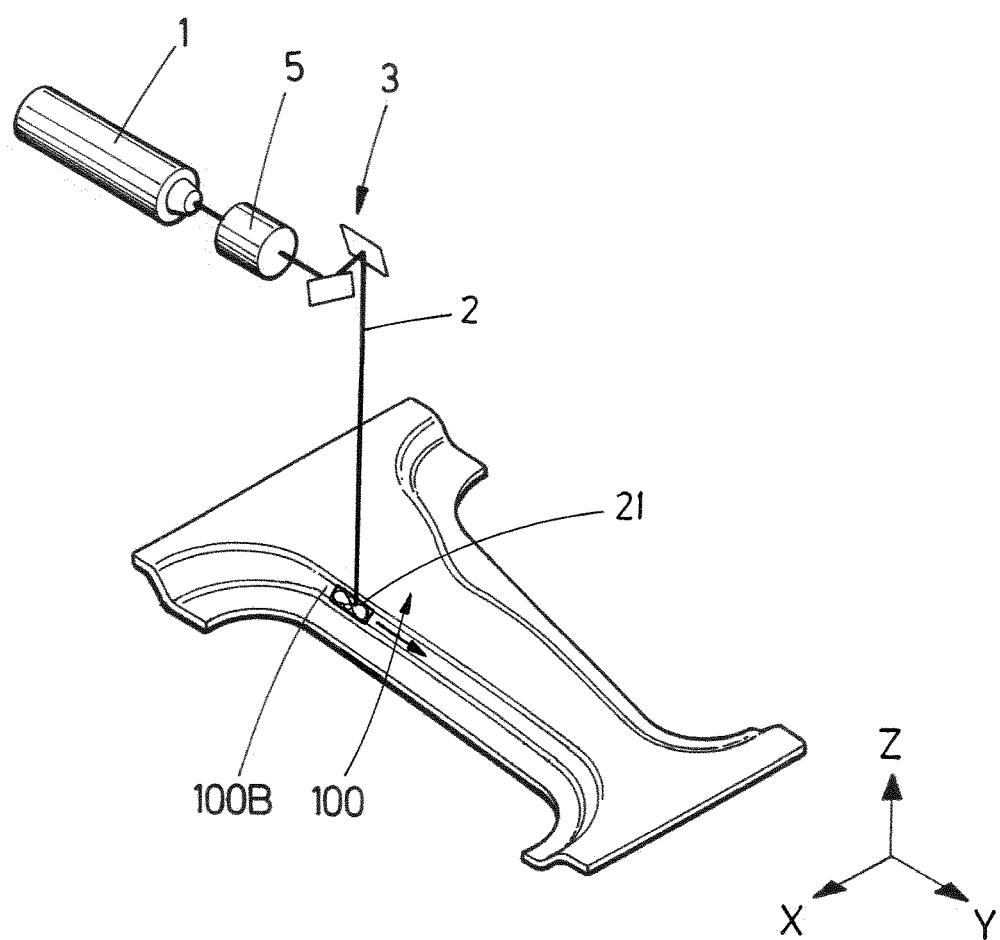

FIGS. 1B and 1C schematically illustrate how the effective spot 21 can be adapted in width so as to carry out heat treatment of two tracks or segments 100A and 100B, respectively, of the workpiece 100, these two tracks or segments having different widths and extending at two substantially different angles with regard to the laser source, that is, the scanner. FIGS. 1D and 1E schematically illustrates how the effective spot can be displaced along a segment 100B of the workpiece having a width that varies along the track, whereby for example the width of the effective spot in the direction perpendicular to its displacement along the segment (that is, perpendicular to the track followed by the effective spot) can be dynamically adapted during this displacement. FIGS. 1D and 1E schematically illustrate how the two-dimensional energy distribution can be adapted during movement of the effective spot 21 along the track so that the effective spot adapts its orientation to a curve in the track, for example, by adapting its orientation in the X-Y-plane when moving along the curved portion of the track.

Figure 1F:
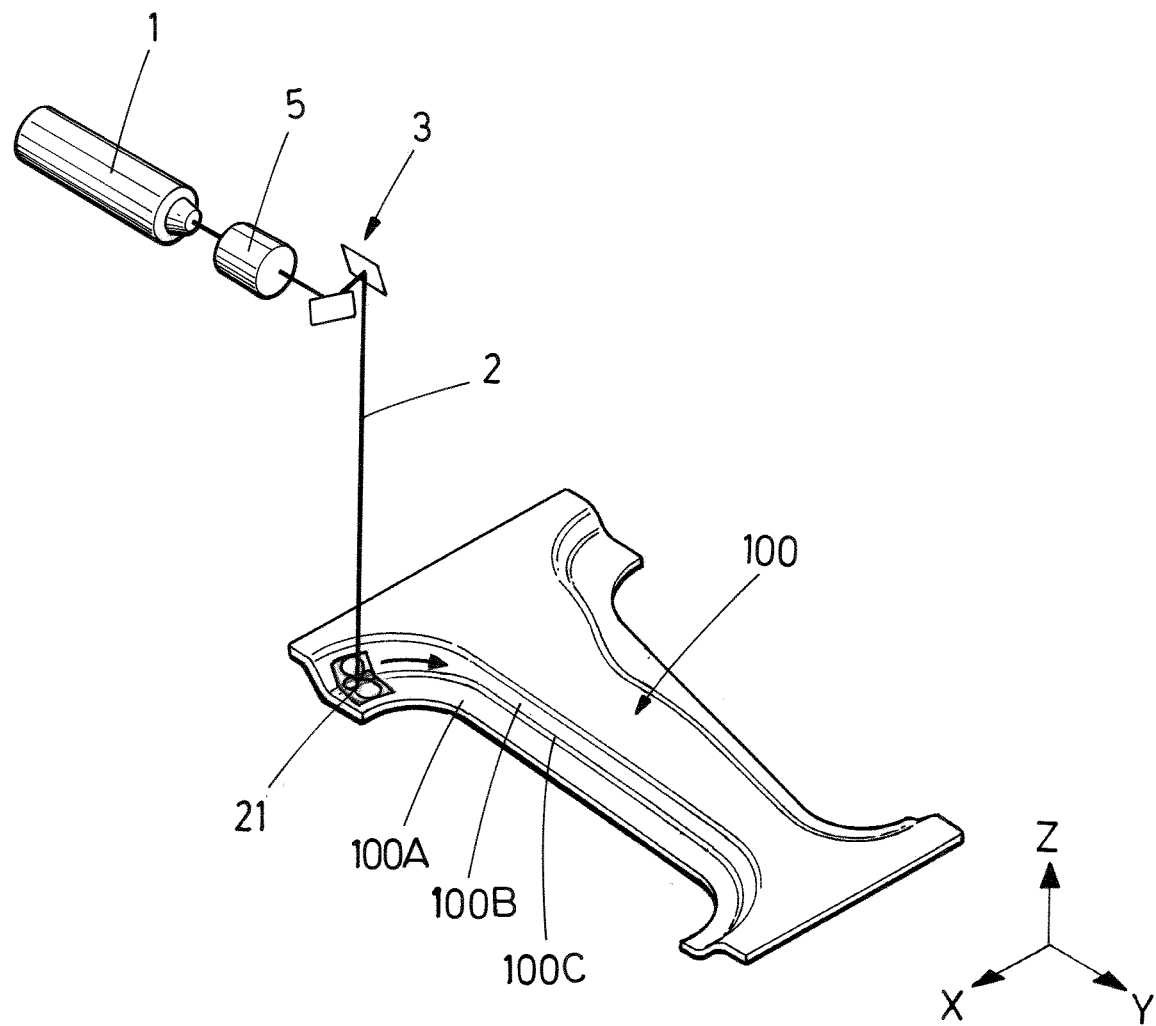

Due to the flexibility with which the two-dimensional energy distribution within the effective spot as well as the shape and dimensions of the effective spot can be adapted, it is relatively easy to adapt the two-dimensional energy distribution also to complex surfaces, such as those of a sheet metal workpiece that has been shaped in a press so as to have a predetermined three-dimensional configuration. For example, FIG. 1F illustrates how the effective spot can be applied to provide for heat treatment of a track comprising two portions 100A and 100B of a pillar for a vehicle, in which said two portions are arranged at different angles in relation to the laser source and separated by a bend 100C. The shape of the effective spot and the two-dimensional energy distribution within the effective spot—that is, the energy distribution along and across the effective spot as projected onto the surface of the object—can be adapted to, for example, the width of the area to be heated, the three-dimensional shape of said area to be heated (so as to, for example, take the bend 100C into account), the orientation of different portions of said area in relation to the laser beam, etc.

In some embodiments of the disclosure, the system can include means 5 for dynamically adapting the size of the primary spot (for example, so as to modify the two-dimensional energy distribution and/or the size of the effective spot 21) and/or the focus of the laser beam along the optical axis. This makes it possible to control (such as to vary or maintain) the size of the primary laser spot while it is being displaced along the scanning pattern, and/or while the effective spot 21 is being displaced in relation to the surface of the object. For example, the optical focus can be adapted to keep the size of the primary spot constant while the primary spot is moving over the surface of the object (for example, to compensate for varying distances between the scanner and the position of the primary laser spot on the object being produced). For example, means for dynamically adapting the focus of the laser beam can in some embodiments of the disclosure comprise a varioSCAN® focusing unit, obtainable from SCANLAB AG (www.scanlab.de).

The specific embodiment discussed above relates to heat treatment of sheet metal, but the same principles can be applied to other kinds of heat treatment, for example, to selective hardening of workpieces, additive manufacturing, welding, laser cladding, etc. For example, the teachings of the present disclosure can be used to enhance prior art welding methods, such as the ones taught by WO-2018/054850-A1. Also, and whereas the illustrated embodiment uses laser light, other embodiments can use other kinds of energy beams.

Figure 2:
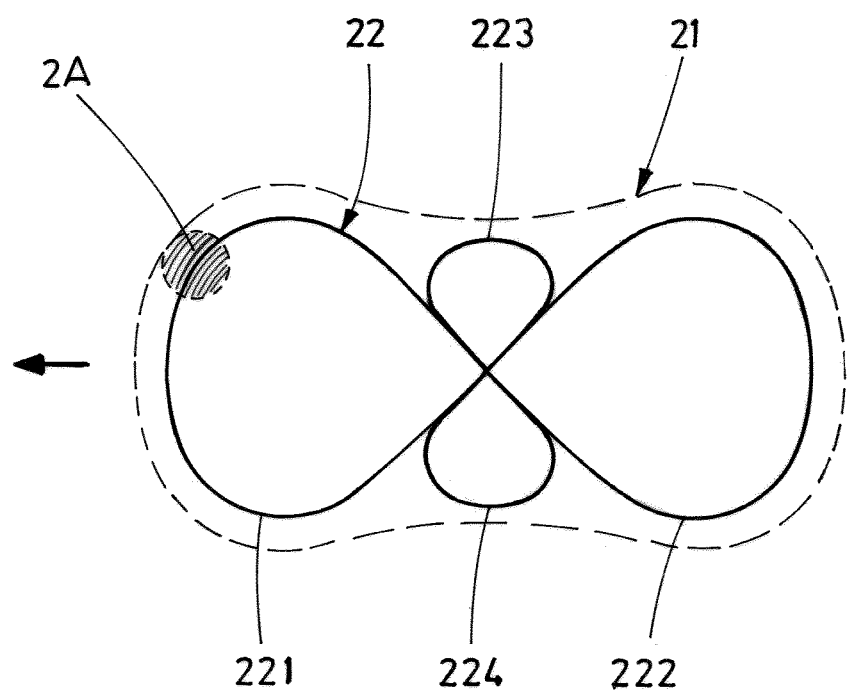
FIG. 2 schematically illustrates an effective laser spot created by a scanning pattern comprising four lobes.

As explained above, it has been found that it can often be practical to provide a scanning pattern comprising curved portions or segments and, preferably, with only few or no sharp transitions between one segment and another, that is, without sharp "corners" in the pattern. It can be preferred that the scanning pattern is free or substantially free from points lacking a defined tangent to the curve. An example of this kind of scanning pattern is schematically illustrated in FIG. 2, where the effective laser spot 21 is created by displacing the primary spot 2A along a "four-leaf clover like" scanning pattern 22 comprising four lobes 221, 222, 223, 224. The lobes can have the same or different shapes and/or sizes. The shapes, sizes, numbers and orientations of the lobes, together with other parameters such as the velocity of the primary spot 1A along different lobes and/or portions of the lobes and/or the power level of the beam in correspondence with different lobes and/or portions of the lobes, can be used to determine and control the two-dimensional energy distribution, and these parameters can be dynamically adapted during operation. As the curve followed by the primary spot 2A is smooth and does not feature any sharp bends or corners, the stress suffered by the scanner can be kept relatively low. Thus, scanning can be carried out at a relatively high speed without reaching or approaching the dynamic limits of the scanner, thereby also improving the durability and the reliability of the system. Repeating the scanning patterns with a relatively high frequency can be preferred in order to avoid undesired temperature fluctuations within the effective laser spot 21.

The energy distribution within the effective spot is in part determined by the shape of the scanning pattern, but also other parameters can influence the energy distribution, such as for example the velocity with which the primary spot travels along the scanning pattern. For example, in a scanning pattern like the one shown in FIG. 2 where segments of the scanning pattern cross each other about the center of the scanning pattern, it may be preferred to scan the primary spot 2A with a higher velocity along those parts of the scanning pattern where the segments cross each other or are close to each other than, for example, at those parts that are remote from said areas such as, for example, the leading and trailing portions of the scanning pattern shown in FIG. 2.

FIGS. 3A-3C schematically illustrate how the present disclosure can be used in the context of a method for hardening journals of a crankshaft, as discussed in WO-2014/037281-A2. More specifically, FIGS. 3A-3C illustrate how the scanning pattern can be adapted to accommodate an oil lubrication hole. The oil lubrication hole 101 is positioned in a surface of a journal 102 of a crankshaft, and said surface extends in a first direction parallel with the axis of rotation of the crankshaft, and in a second, circumferential direction W. In FIG. 3A, a substantially rectangular equivalent effective spot 21 is used, having a leading portion with higher power density and a trailing portion with lower power density. This can for example be achieved using a "four-leaf-clover" scanning pattern 22 with four lobes as schematically illustrated at the top of FIG. 3A. The effective spot 21 moves along the journal in the circumferential direction thereof, for example, due to rotation of the crankshaft around its longitudinal axis.

As schematically illustrated in FIG. 3B, when the effective spot 21 approaches the oil lubrication hole 101 due to the relative movement between the effective spot and the surface of the journal, the energy distribution is substantially adapted by adapting, at least, the scanning pattern so as to reduce the power or energy density towards the center of the leading portion, so as to avoid overheating of the area adjacent to the oil lubrication hole 101. Here, the effective laser spot is substantially U-shaped. This can, for example be achieved with a scanning pattern 22 featuring two lobes 221 and 222, as schematically illustrated in FIG. 3B. Subsequently, once the oil lubrication hole 101 has passed the leading portion of the effective spot 21, the original energy distribution at the leading portion is restored, whereas the energy distribution at the trailing portion is adapted to accommodate for the oil lubrication hole 101, by reducing the energy or power density towards the center of the trailing portion. Here, the effective spot 21 substantially adopts an inverted-U-shape, which can be achieved by substantially inverting the scanning pattern of FIG. 3B, as schematically illustrated at top of FIG. 3C.

That is, while the oil lubrication hole 101 is passing through the effective spot 21, the energy distribution is adapted by adapting parameters including the scanning pattern and, optionally, also other parameters such as the velocity of the primary spot in correspondence with different segments of the scanning pattern. By means of these adaptations, it is possible to apply less energy to the more heat sensitive area adjacent to the oil lubrication hole, than what is applied to the surface to be hardened away from said oil lubrication hole. The area around the oil lubrication hole can be hardened without harming the more heat sensitive sub-area adjacent to the oil lubrication hole; the lateral portions of the U-shaped effective laser spot serve to harden the areas at the sides of the oil lubrication hole. Due to the smooth shape of the curves defining the scanning patterns shown in FIGS. 3A-3C, the need for sudden substantial accelerations or decelerations of mechanical items of the scanner, such as scanning mirrors, can be avoided or reduced, compared to prior art solutions involving scanning patterns featuring sudden changes of direction, for example, when transiting from one straight segment to another.

Figure 4:
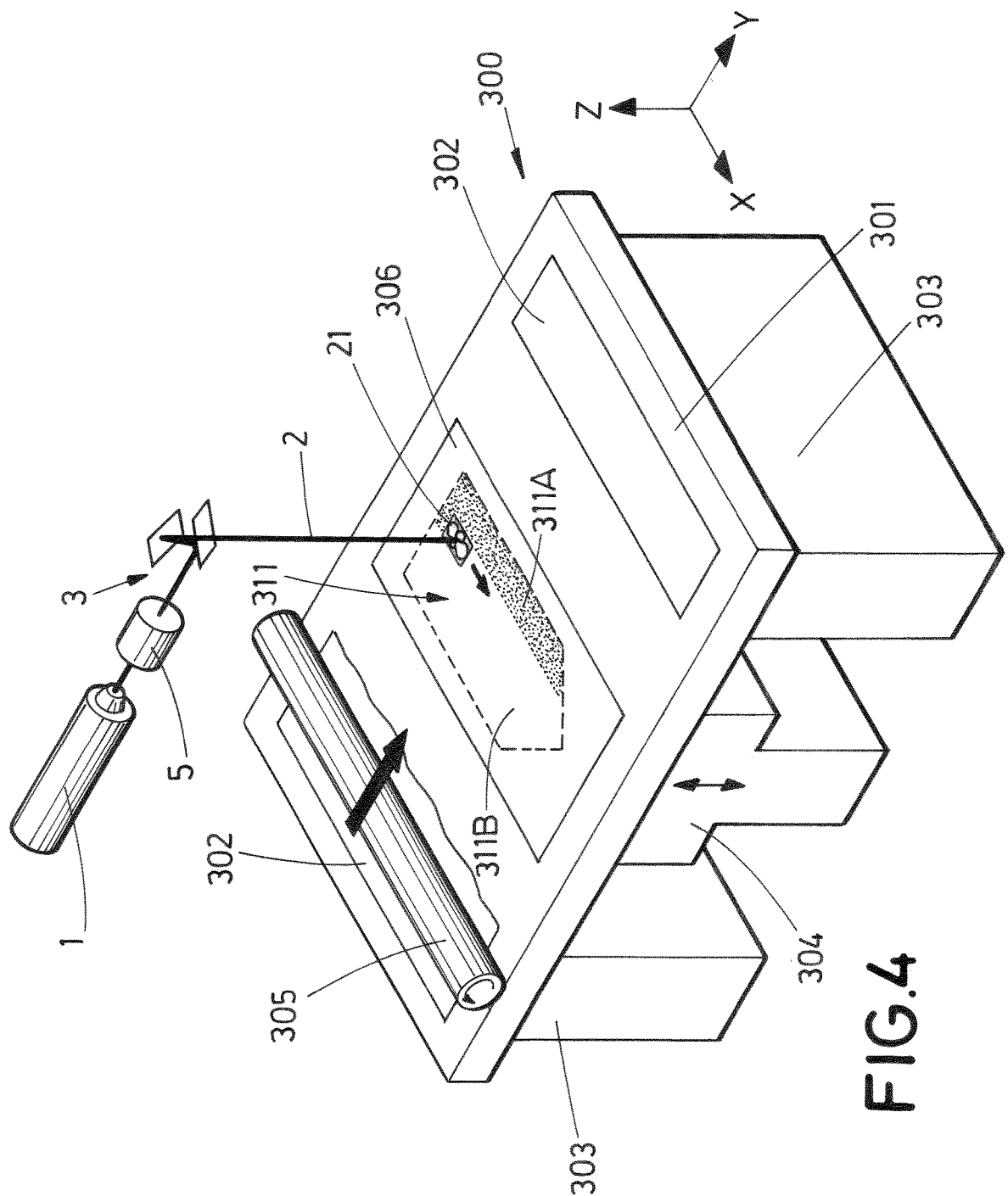
FIG. 4 is a schematic perspective view of a system for powder bed fusion in accordance with an embodiment of the disclosure.

FIG. 4 shows how the disclosure can be applied in the context of additive manufacturing, for example, in the context of an SLS system for producing an object out of a building material that is supplied in powder form, such as metal powder. The system 300 comprises a laser equipment 1 for producing a laser beam 2 as described above, including the scanner 3 including two mirrors or similar for two-dimensional scanning of a laser beam 2 in the horizontal (X-Y) plane. The system further comprises an arrangement for distribution of the building material, comprising a table-like arrangement with a top surface 301 with two openings 302 through which the building material is fed from two feed cartridges 303. In the center of the top surface 301 there is an additional opening, arranged in correspondence with a platform 304 which is displaceable in the vertical direction, that is, in parallel with a Z axis of the system. Powder is supplied from the cartridges 303 and deposited on top of the platform 304. A counter-rotating powder leveling roller 305 is used to distribute the powder in a layer 306 having a homogeneous thickness.

The laser beam is projected onto the layer 306 of the building material on top of the platform 304 to fuse the building material in a selected region or area 311, which corresponds to a cross section of the object that is being produced. Once the building material in this area 311 has been fused, the platform is lowered a distance corresponding to the thickness of each layer of building material, a new layer 306 of building material is applied using the roller 305, and the process is repeated, this time in accordance with the cross section of the object to be produced in correspondence with the new layer.

In accordance with the present embodiment of the disclosure, the laser beam (and the primary laser spot that the beam projects on the building material) is repetitively scanned at a relatively high speed following a scanning pattern shaped as a curve without bends defining four lobes, as schematically illustrated in FIG. 4, thereby creating an effective laser spot 21, illustrated as a square in FIG. 4. Obviously any other suitable scanning pattern can be used, for example, a scanning pattern having a different number of lobes. This is achieved using the scanner 4. This effective laser spot 21 is displaced according to a defined track, for example, in parallel with a plurality of parallel lines. In FIG. 4, an arrow indicates how the effective laser spot 21 can, for example, be displaced in parallel with the X axis of the system. FIG. 4 illustrates how a portion 311A of the area 311 to be fused has been fused during a preceding sweep of the effective laser spot 21 in parallel with the X axis, whereas another portion 311B is still waiting to be fused. After it has been fused, the platform 304 will be lowered and a new layer of building material in powder form will be applied. The displacement of the effective laser spot 21 according to the track can likewise be achieved by the scanner 3, and/or due to displacement of the scanner or associated equipment, for example, along tracks (not shown in FIG. 4), such as tracks extending in parallel with the X axis and/or the Y axis. Due to the smooth shape of the scanning pattern, a high scanning speed can be achieved without reaching the dynamic limits of the scanner or without jeopardizing the durability or reliability of the scanner and its performance.

Figure 5:
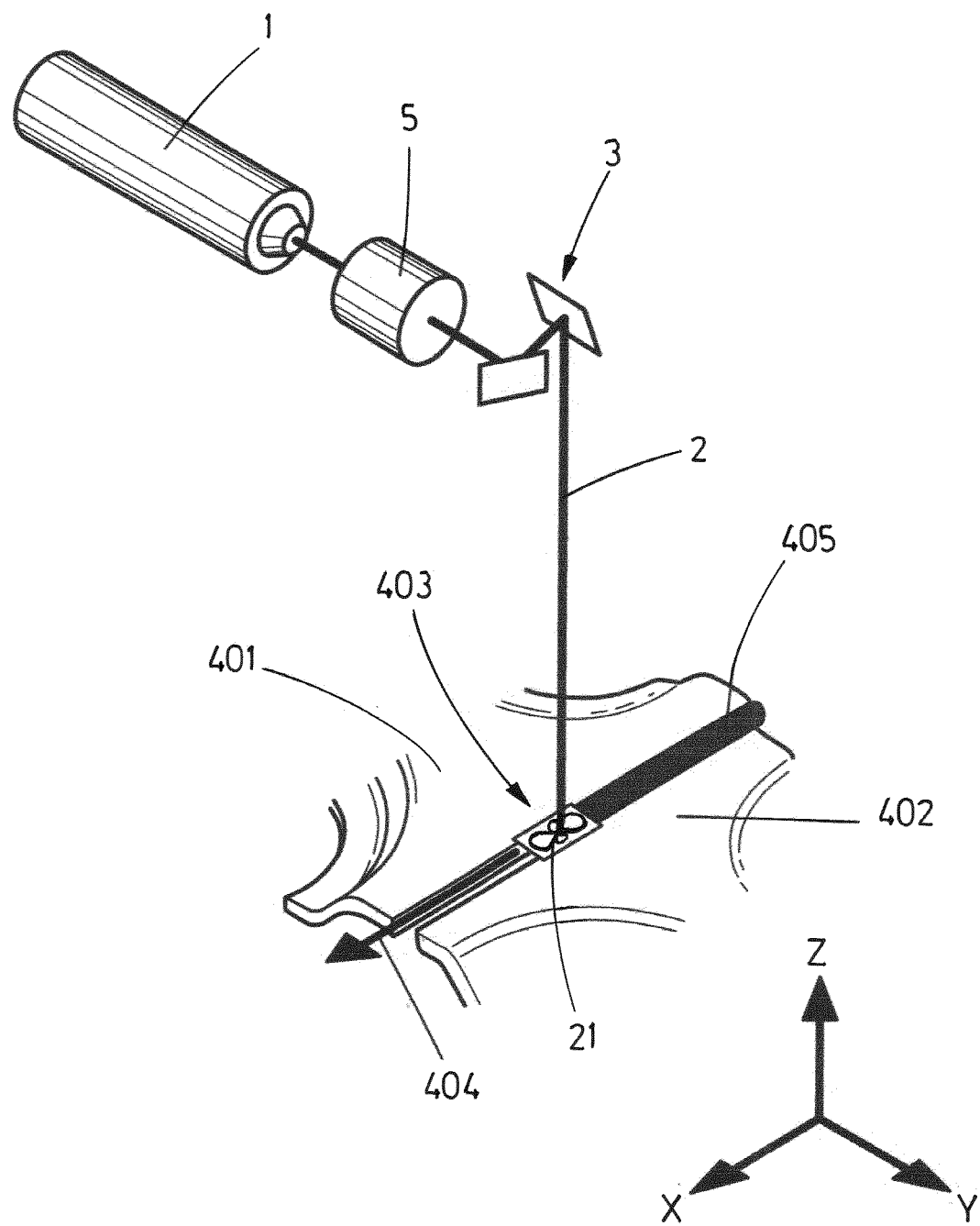
FIG. 5 is a schematic perspective view of a system for welding in accordance with an embodiment of the disclosure.

FIG. 5 schematically illustrates a system for welding in accordance with one possible embodiment of the disclosure. In this embodiment, the system comprises an equipment 1 for producing an energy beam 2, and a scanner 3 including two mirrors or similar for two-dimensional scanning of the beam 2 in the horizontal (X-Y) plane. In some embodiments of the disclosure, the system can include means 5 for dynamically adapting the size of the primary spot (for example, so as to modify the two-dimensional energy distribution and/or the size of the effective laser spot 21) and/or the focus of the beam along the optical axis. This makes it possible to control (such as to vary or maintain) the size of the primary spot while it is being displaced along the scanning pattern, and/or while the effective spot 21 is being displaced in relation to an interface area. For example, the optical focus can be adapted to keep the size of the primary spot constant while the primary spot is moving over the surface of the interface area (for example, to compensate for varying distances between the scanner and the position of the primary spot on the interface area).

The system further comprises means (not shown in FIG. 5) for holding or supporting two metal parts 401 and 402 to be welded together. The beam 2 is projected onto an interface area 403 where the two parts 401 and 402 mate, that is, where surfaces thereof face each other so that the two parts can be welded together. This is achieved by producing an effective spot 21 by two-dimensional scanning of the actual or primary spot of the beam, as described above. This effective spot 21 is swept along a track 404, schematically illustrated by an arrow in FIG. 5, so as to melt mating portions of the two parts, as described above. By solidification, the weld seam or joint 405 is produced. That is, in accordance with this embodiment of the disclosure, the beam (and the primary spot that the beam projects on the interface area) is repetitively scanned at a relatively high speed following a scanning pattern with a smooth shape, schematically illustrated as four lobes, although any other suitable scanning pattern can be used, thereby creating an effective spot 21, illustrated as a square in FIG. 5. This is achieved by using the scanner 3. This effective spot 21 is displaced according to the track 404, for example, as shown in FIG. 5, in parallel with the X axis of the system.

The displacement of the effective laser spot 21 along the track can likewise be achieved by the scanner 3, and/or by displacement of the scanner or associated equipment, for example, along rails (not shown in FIG. 5), such as rails extending in parallel with the X axis. It can also be achieved by, for example, displacing the parts 401 and 402 in relation to the position of the scanner.

The two-dimensional energy distribution can be adapted to the specific conditions of the task to be performed, as explained above. For example, a non-symmetric effective spot can be produced to accommodate differences in thickness between the two parts 401 and 402, and/or different materials (for example, one of the parts 401 may be of one material, and the other part 402 part may be of another material. For example, the two parts may be of different metals such as of different metal alloys, and require different heating for welding the two parts together in an appropriate manner, with a quality weld seam and/or with efficient use of energy. In such cases, a non-symmetric energy distribution can be preferred, so as to apply energy differently onto one of the parts than onto the other. Also, the effective spot and its two-dimensional energy distribution can be dynamically adapted during the displacement of the effective spot along the track.

Figure 6:
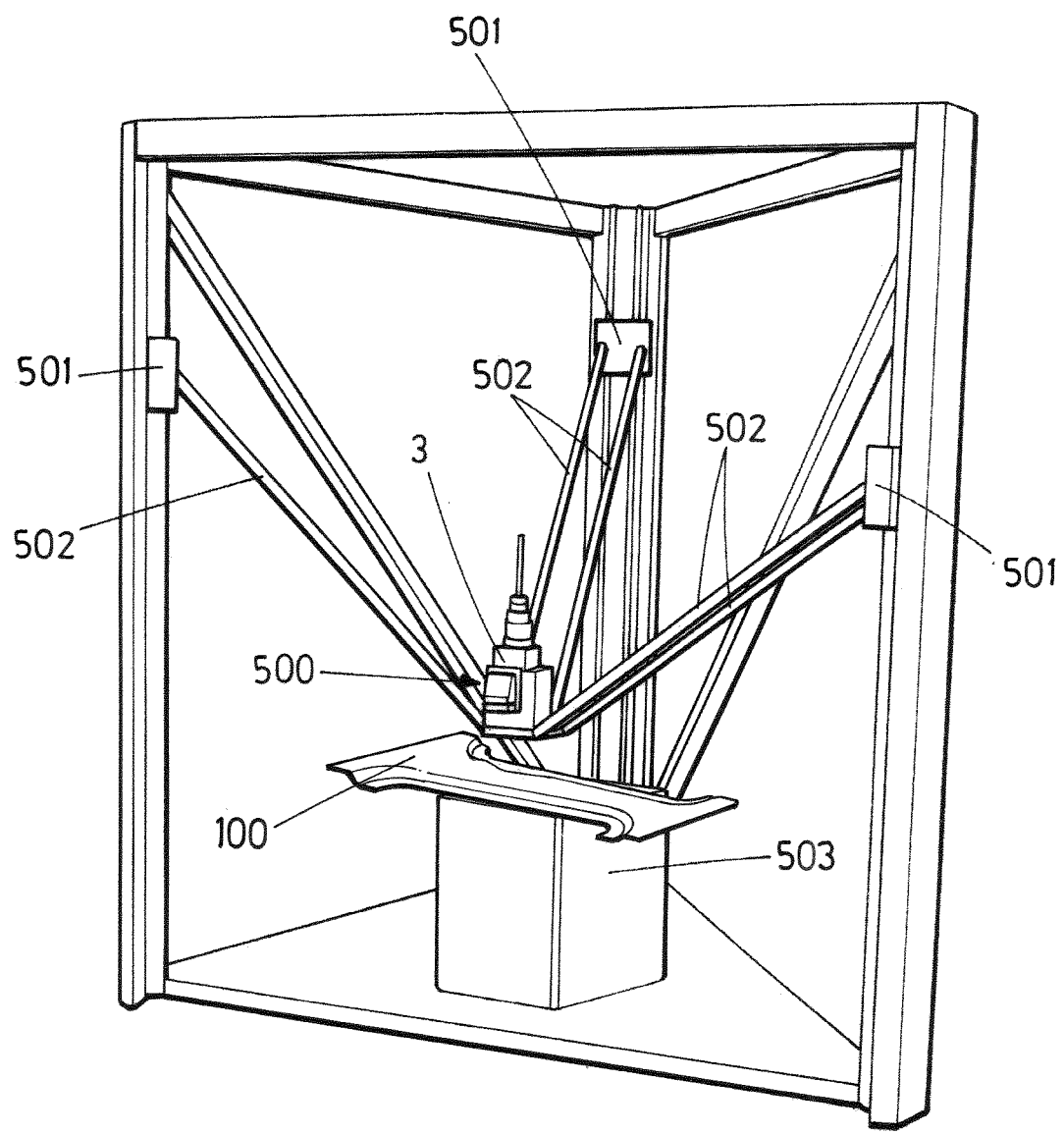
FIG. 6 illustrates an embodiment of the disclosure including means for displacing the scanner in relation to an object subjected to heat treatment.

FIG. 6 schematically illustrates how a processing head 500, in accordance with one possible embodiment of the disclosure, can include a scanner 3 arranged to be displaced in relation to an object such as a sheet metal object 100 to be subjected to heat-treatment, in this case, a pillar for a vehicle. The processing head 500 is connected to actuators 501 through linkages 502. In this embodiment of the disclosure, the displacement is based on the parallel manipulator concept. However, any other suitable means of displacement of the processing head can be used, such as a robot arm, etc. In some embodiments of the disclosure, it is the object being produced that is displaced in relation to the processing head. Also, a combination of these two approaches can be used. In FIG. 6, the sheet metal workpiece 100 is supported by schematically illustrated support means 503.

Figure 7A:
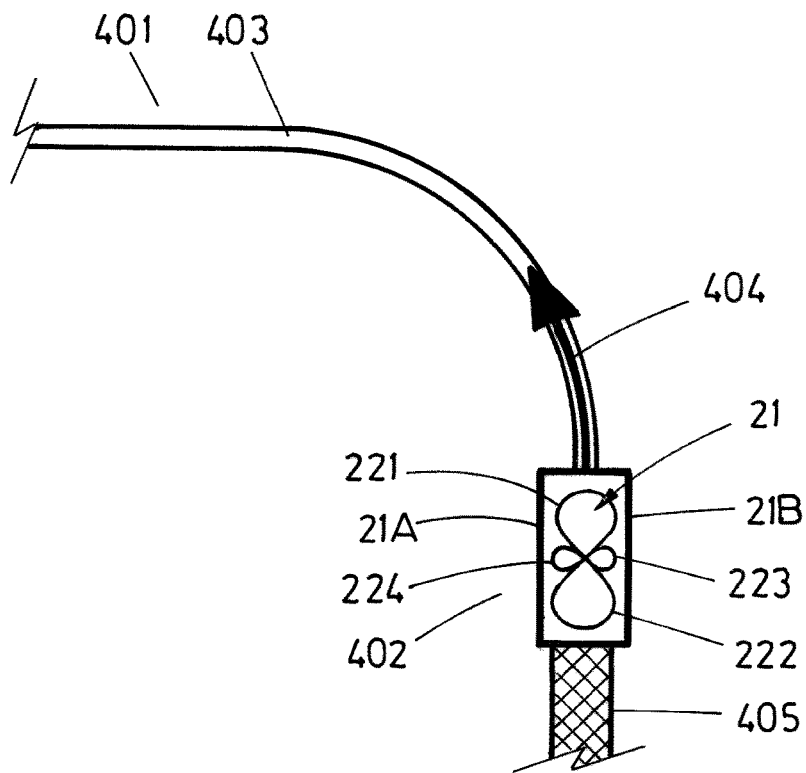
FIGS. 7A and 7B are schematic top views illustrating the method according to one possible embodiment of the disclosure applied to welding along a partially curved track.
Figure 7B:
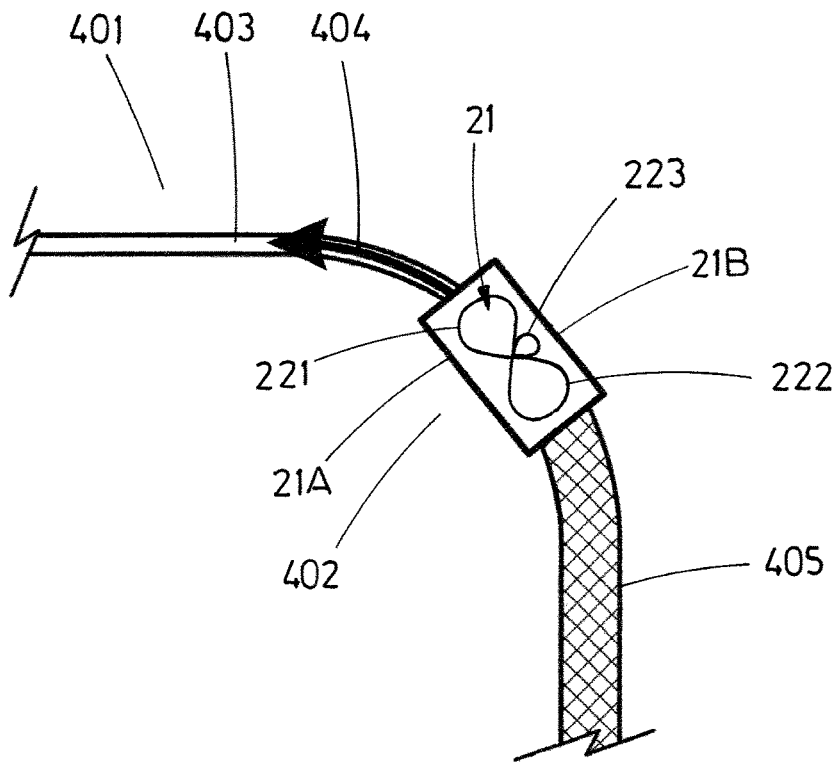

FIGS. 7A and 7B schematically illustrate how the four lobes 221-224 for a scanning pattern used at a straight portion of a track can be re-oriented and adapted to follow a curved track. The illustrated example relates to laser welding, but the same principle can be applied to any other suitable application in which the effective spot has to follow a non-straight track. In the exemplary embodiment shown in FIGS. 7A and 7B, two parts 401 and 402 having curved mating portions are welded together along a track 404 including a curved section, in correspondence with an interface area 403. At a straight portion of the curved track, the scanning pattern features four lobes 221-224 as schematically illustrated in FIG. 7A. During movement of the effective spot 21 along the curved section of the track 404, the velocity at the radially inner portion 21A of the effective spot is lower than the velocity of the radially outer portion 21B. The two-dimensional energy distribution can be dynamically adapted to compensate for this difference in velocity, for example, by adapting or cancelling the radially inner lobe 224, as schematically illustrated in FIG. 7B. Also, the adaptation of the two-dimensional energy distribution can serve to properly align the effective spot 21 with the direction of the track—that is, basically, with the tangent to the curved track—at each point along the track.

Figure 8A:
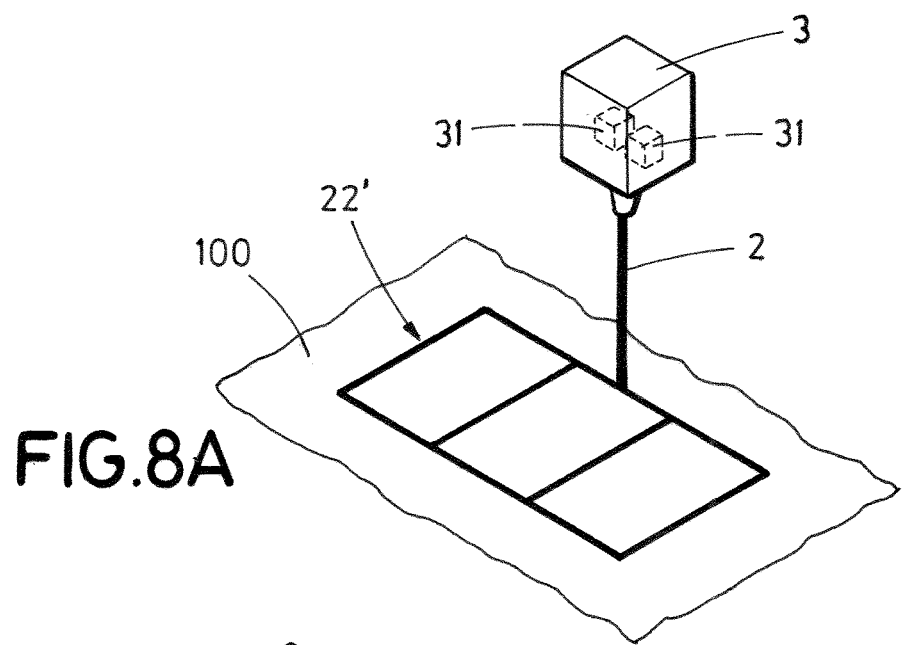
FIGS. 8A-8B are schematic illustrations of the principles underlying one possible way of programming a system including a scanner, for example, so as to carry out a method of the disclosure.
Figure 8B:
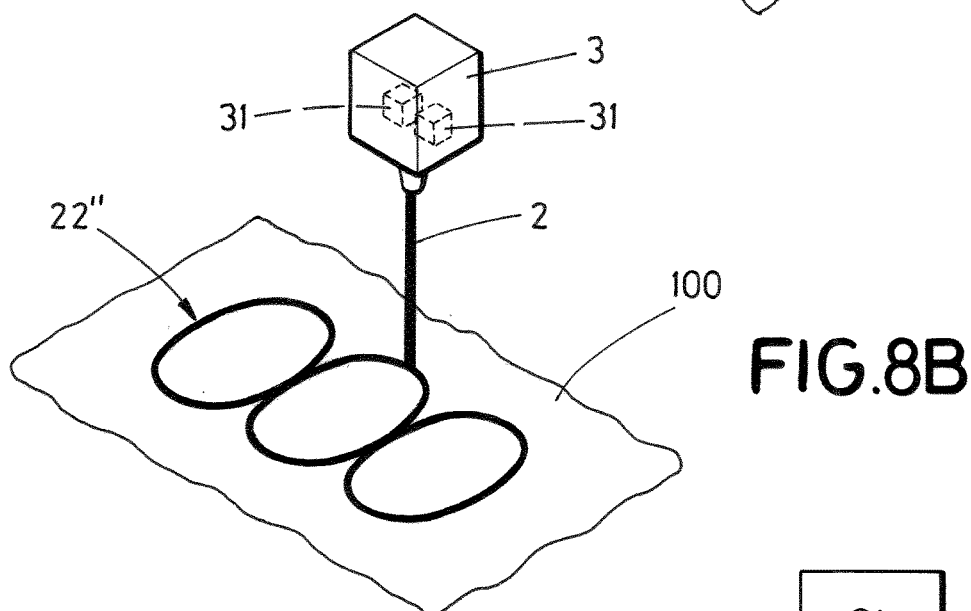

FIG. 8A schematically illustrates how a system including a scanner 3 has been programmed to operate the scanner so that a laser beam 2 follows a scanning pattern 22' in line with one of the scanning patterns disclosed in WO-2015/135715-A1, with changes in direction by 90 degrees between segments following each other. As explained above, forcing a scanner to operate accordingly at a very high speed can cause the scanner to reach its operational limits. This may end up causing the scanner to fail to strictly follow the programmed scanning pattern: the real movements of the mirrors of the scanner may differ from the strictly programmed ones, especially at the points where the 90 degree changes in direction are to take place, thereby causing the corners to be rounded. FIG. 8B schematically illustrates one possible scanning pattern 22" actually followed by the laser beam when programmed to follow the scanning pattern 22' of FIG. 8A at high speed.

In accordance with one embodiment, the real scanning pattern is detected, for example, by using decoders 31 that track the real movement of the mirrors of the scanner 3. Once the real movement followed by the mirrors is detected, the corresponding data can be used to reprogram the scanner 3 so as to operate not according to the original scanning pattern 22', but according to the scanning pattern 22", or according to a more or less similar scanning pattern. In this way, the operational stress to which the scanner is subjected can be reduced. This process can be repeated several times, until a desired conformity between the programmed scanning pattern and the real scanning pattern followed by the laser beam has been reached.

Figure 8C:
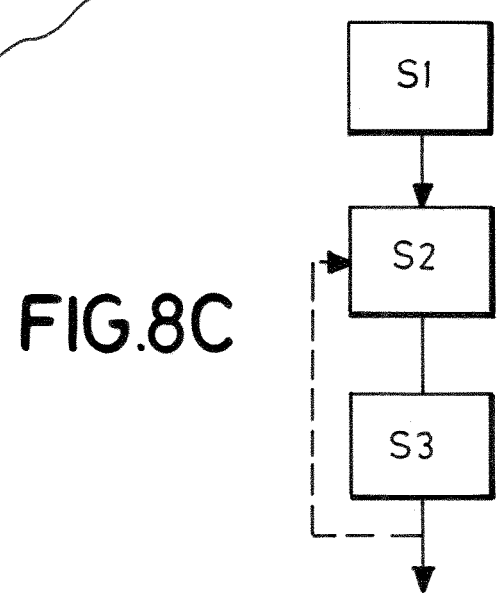
FIG. 8C is a flow chart showing steps of that method.

The flowchart of FIG. 8C includes a first step S1 in which the system is programmed to cause the scanner to (theoretically) operate so as to make the laser beam follow a first scanning pattern 22', such as one involving only straight segments oriented at 90 degrees in relation to each other. In step S2, the system is operated as programmed and data originating from encoders 31 of the scanner 3 are collected, thereby determining the real operation of the scanner, which turns out to follow a second scanning pattern 22" differing from the first scanning pattern 22'. In step S3, these data are used to reprogram the scanner, for example, to instruct it to follow the second scanning pattern 22" or similar. Steps S2 and S3 can then be repeated, if desired, until the difference between the programmed scanning pattern and the real scanning pattern followed by the laser beam is within a certain range, calculated as deemed convenient.

FIG. 9 illustrates a scanning pattern 21 with four lobes 221, 222, 223, 224. The scanning pattern has been created by dimensioning the lobes of a basic or original pattern layout (for example, based on four spline curves, one for each lobe) in accordance with a two-axis (x, y) coordinate system. The dimensions and orientations of the lobes have been established by defining the positions of a plurality of control points of the basic pattern layout with reference to the coordinate system. The positions of these control points are defined in the "x" and "y" columns of the table in FIG. 9. The length of each segment (defined as the part of the scanning pattern between two consecutive control points) has been estimated or calculated and is indicated in the "L" column of the table. The energy applied to each segment during one scan is determined by the beam power, scanning speed and length of the segment. With these data, the energy distribution throughout the effective spot created by the two-dimensional scanning determined by the scanning pattern can be estimated or calculated. By changing one or more of the parameters (scanning pattern, scanning speed, beam power . . . ), the two-dimensional energy distribution can be changed. Thus, it is easy to tailor the two-dimensional energy distribution for different needs, such as for different applications and objects, taking into account varying characteristics of the object (and/or of the desired heating) along the track to be followed by the effective spot (such as, for example, a varying width of a track to be heated, the presence of more heat sensitive portions, etc.). One or more basic layouts may be used to establish scanning patterns that can remain fixed and/or be dynamically varied during heating of the object. For example, the scanning pattern illustrated in FIG. 9 is suitable for establishing an effective spot with a higher energy density in correspondence with one end of the effective spot, thus providing for a higher energy density at the leading edge of the effective spot when the effective spot travels in the direction indicated by the arrow in FIG. 9.

Figure 10A:
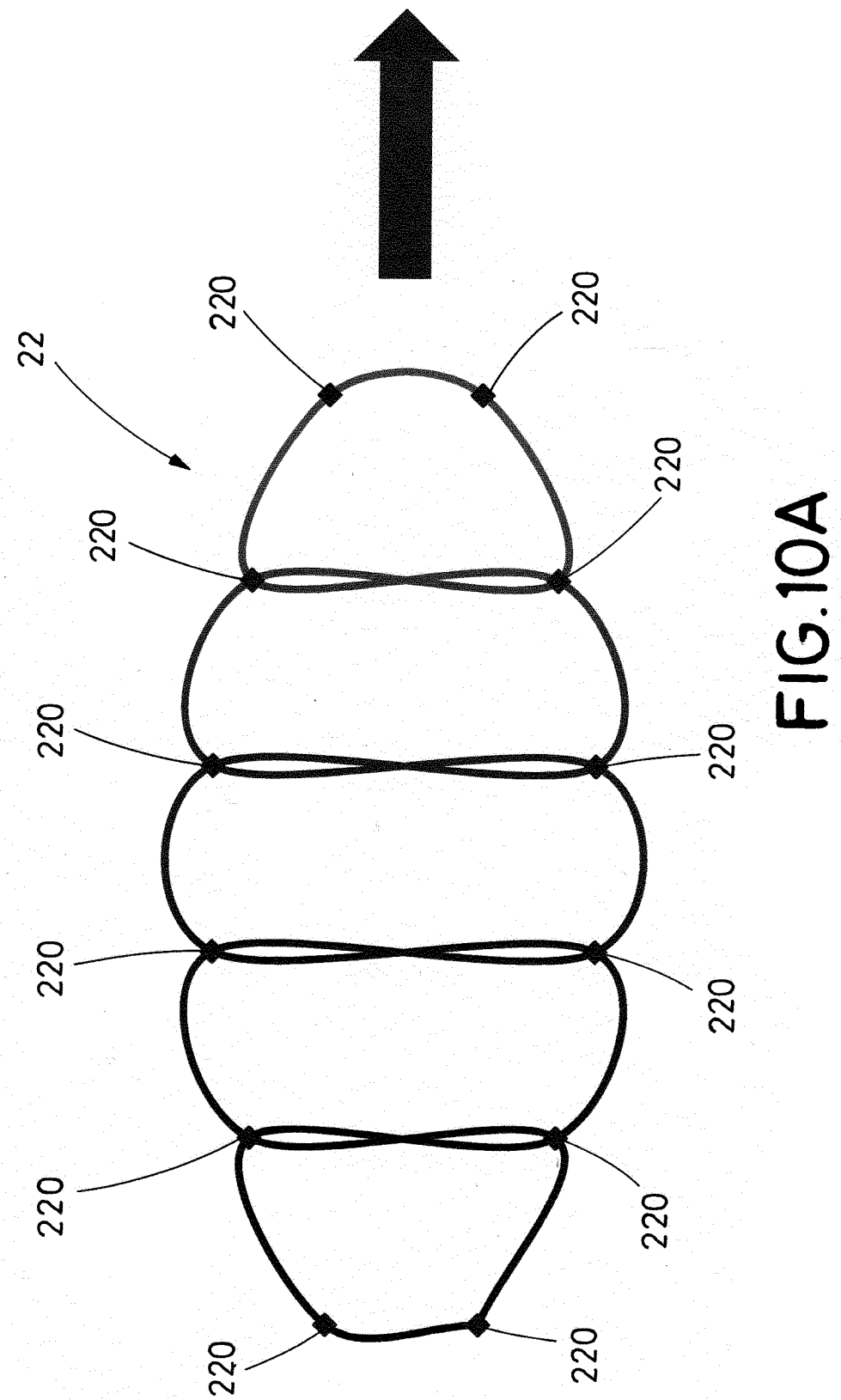
FIGS. 10A-10C illustrate other scanning patterns that can be used in accordance with some embodiments of the disclosure.
Figure 10B:
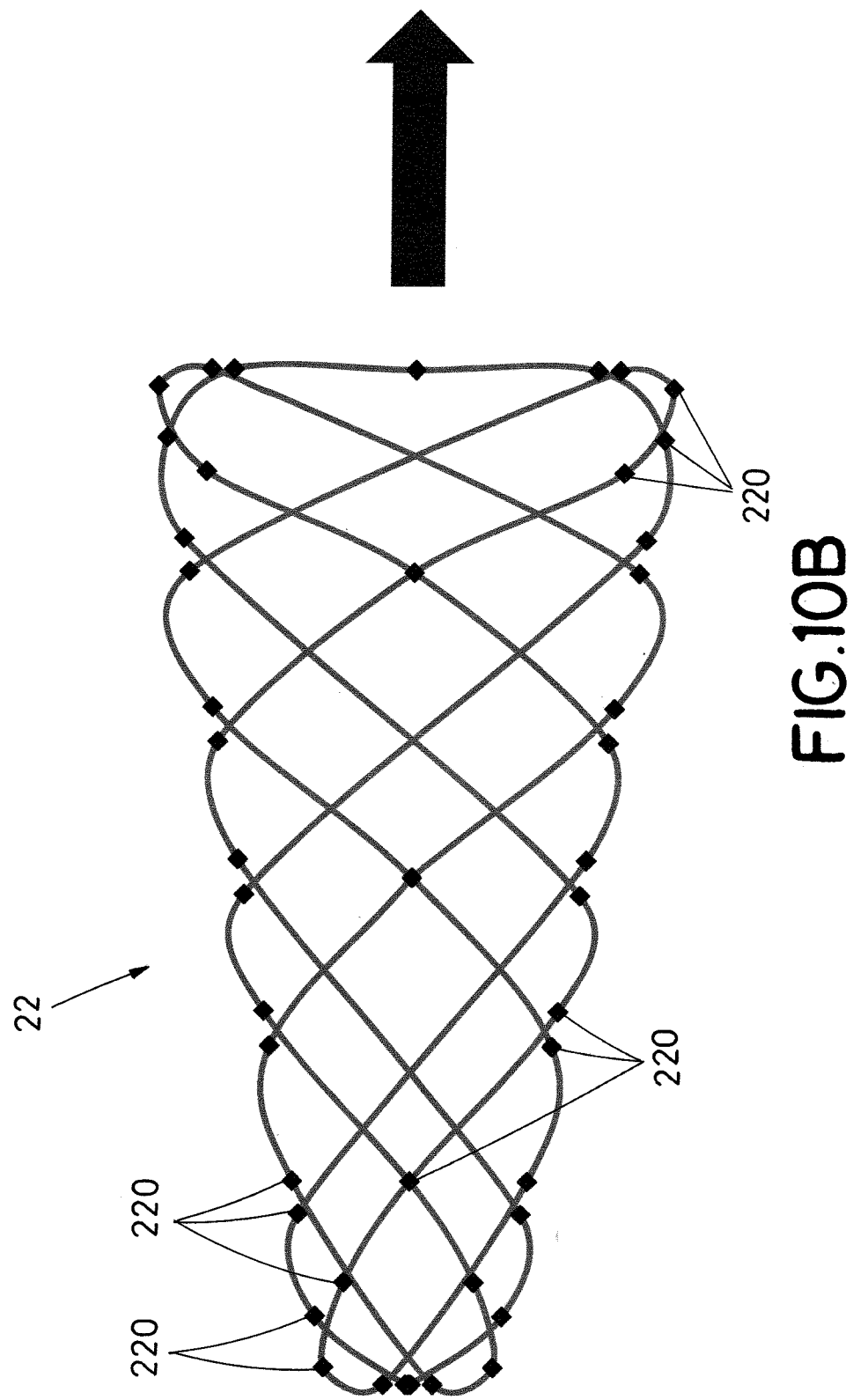
Figure 10C:
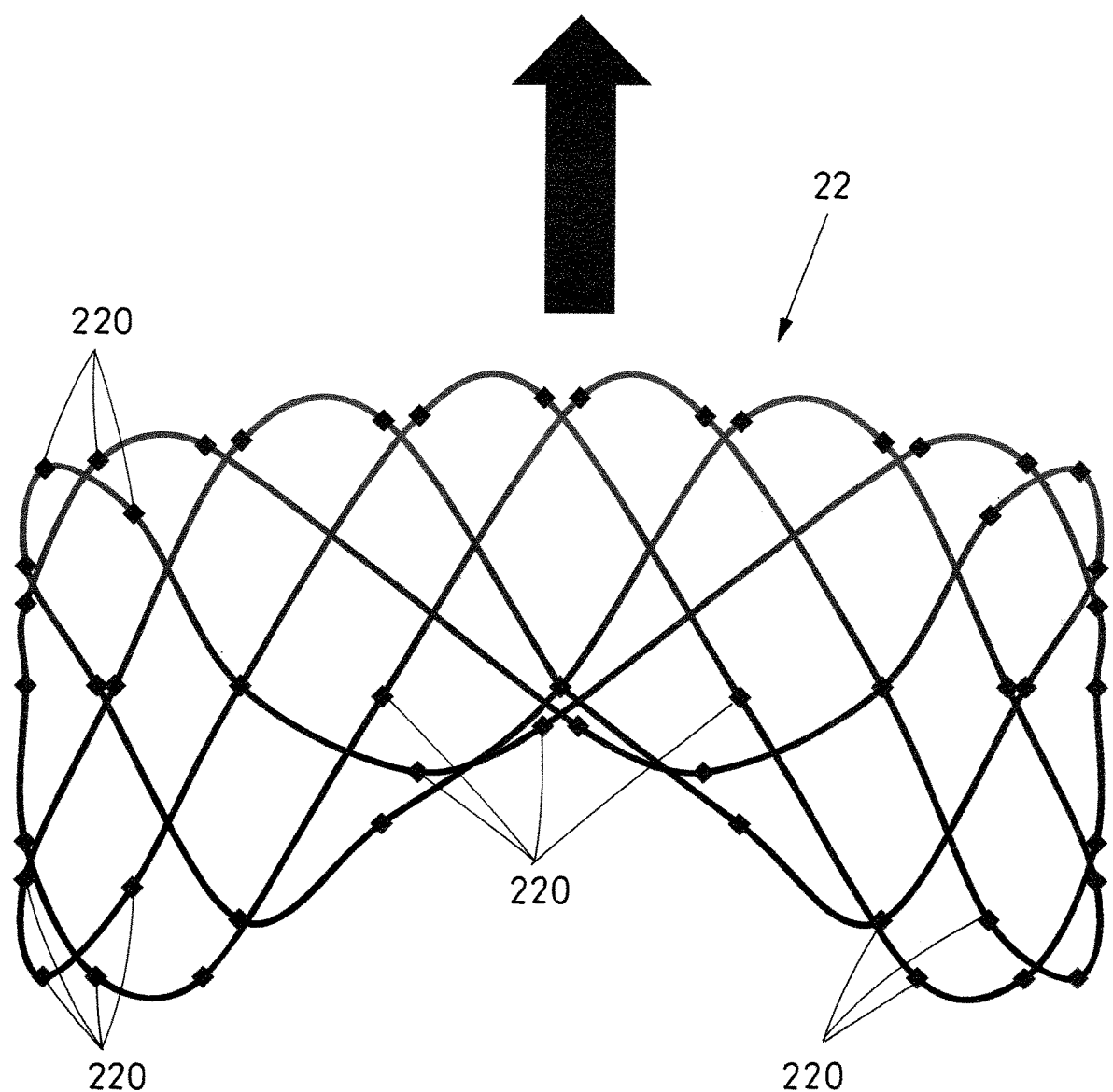

FIGS. 10A-10C illustrate examples of different scanning patterns 22. The arrows merely indicate examples of directions in which such scanning patterns may travel. The scanning patterns have been established by using a basic pattern layout, for example, based on a program for creating Lissajous patterns or similar, and by determining the positions of control points 220 in relation to a coordinate system (not shown), in line with what has been explained in relation to FIG. 9. For example, in the case of the scanning pattern shown in FIG. 10A, a higher energy density at the leading edge of the effective spot when travelling in the direction illustrated by the arrow can for example be obtained by a higher scanning speed in correspondence with the trailing part of the scanning pattern than in correspondence with the leading part. As explained above, one or more of these or other scanning patterns may be assigned to different portions of a track along an object to be heated in correspondence with the track, and/or different energy distributions over the scanning pattern can be assigned to different portions of the track, for example, so as to dynamically adapt the two-dimensional energy distribution of the effective spot while it is travelling along the track, for example, according to the principles schematically illustrated in FIGS. 3A-3C.

It should be observed that the different specific scanning patterns discussed above and illustrated in the respective drawings are in no way intended to represent scanning patterns that are adequate or optimized for the described purposes. They are merely intended to schematically illustrate the concept of using scanning patterns in accordance with the disclosure and adapting them in accordance with the specific two-dimensional energy distribution that is selected at each specific moment, so as to produce the heating in the desired manner. The person skilled in the art will typically choose suitable scanning patterns using simulation software and trial-and-error approaches. In this text, the term "comprises" and its derivations (such as "comprising", etc.) should not be understood in an excluding sense, that is, these terms should not be interpreted as excluding the possibility that what is described and defined may include further elements, steps, etc.

On the other hand, the disclosure is obviously not limited to the specific embodiment(s) described herein, but also encompasses any variations that may be considered by any person skilled in the art (for example, as regards the choice of materials, dimensions, components, configuration, etc.), within the general scope of the disclosure as defined in the claims.

The invention claimed is:

1. A method for heating at least one selected portion of an object, the method including the following steps:
   projecting an energy beam onto a surface of the object so as to produce a primary spot on the surface, and repetitively scanning the beam in two dimensions in accordance with a scanning pattern so as to establish an effective spot on the surface, the effective spot having a two-dimensional energy distribution, and
   displacing the effective spot in relation to the surface of the object to progressively heat the at least one selected portion of the object,
   wherein the scanning pattern comprises a plurality of interconnected curved segments, and
   wherein the scanning pattern comprises at least three lobes, and
   wherein at least two of the lobes have different shapes, at least two of the lobes have different sizes, or a combination thereof.

2. The method according to claim 1, wherein the tangent to the scanning pattern is defined in correspondence with all points of the scanning pattern.

3. The method according to claim 1, wherein the scanning pattern does not comprise any straight segments.

4. The method according to claim 1, wherein the scanning pattern comprises curved and straight segments, and wherein total length of all curved segments is larger than the total length of all straight segments.

5. The method according to claim 1, wherein the scanning pattern comprises at least one point where one segment of the scanning pattern crosses another segment of the scanning pattern.

6. The method according to claim 1, wherein the number of lobes and/or the shape of the lobes is varied while the effective spot is displaced in relation to the surface of the object.

7. The method according to claim 1, wherein the two-dimensional energy distribution of the effective spot is dynamically adapted during displacement of the effective spot in relation to the surface of the object.

8. The method according to claim 7, wherein adaptation of the two-dimensional energy distribution of the effective spot is carried out by
   adapting the power of the beam, and/or
   adapting the scanning pattern, and/or
   adapting the velocity with which the primary spot moves along at least a portion of the scanning pattern.

9. The method according to claim 1, wherein focus of the beam and/or the size of the primary spot are dynamically adapted during displacement of the primary spot along the scanning pattern and/or during displacement of the effective spot in relation to the surface of the object.

10. The method according to claim 1, including the following steps, prior to projecting the energy beam onto a surface of the object:
    a) establishing a plurality of scanning patterns, and
    b) assigning different ones of said scanning patterns to different portions of a track to be followed by the effective spot on the surface of the object,
    wherein the step of displacing the effective spot in relation to the surface of the object to progressively heat the at least one selected portion of the object comprises displacing the effective spot along the track and changing the scanning pattern so that, at each portion of the track, the effective spot is produced by the beam following the scanning pattern assigned to the respective portion of the track.

11. The method according to claim 1, wherein
    the primary spot is displaced on the surface of the object in accordance with the scanning pattern with a first average velocity, and wherein the effective spot is displaced in relation to the surface of the object with a second average velocity, the first average velocity being higher than the second average velocity;
    and/or
    wherein the beam is scanned in accordance with the scanning pattern so that the scanning pattern is repeated by the beam with a frequency of more than 10 Hz;
    and/or
    wherein the size of the effective spot is more than 4 times the size of the primary spot.

12. The method according to claim 1, wherein the energy beam is a laser beam.

13. The method according to claim 1, wherein the two-dimensional energy distribution of the effective spot is dynamically adapted during displacement of the effective spot in relation to the surface of the object, in response to at least one change in angle between the energy beam and a portion of the surface of the object being heated by the effective spot, and/or in relation to at least one change in direction of a track followed by the primary spot.

14. A system for heating at least one selected portion of an object, the system comprising:
    means for supporting an object; and
    means for producing an energy beam and for projecting the energy beam onto a surface of the object;
    wherein the system comprises a scanner for scanning the energy beam in at least two dimensions; and
    wherein the system is arranged for carrying out the method of claim 1.

15. A method of programming a system arranged for carrying out the method of claim 1, wherein the system includes means for producing the energy beam and a scanner for scanning the energy beam in at least two dimensions, the method including the following steps:
    programming the system so as to instruct the scanner to scan the energy beam according to a first scanning pattern,
    detecting a second scanning pattern followed by the energy beam when the system is operating as programmed, and
    reprogramming the system based on the second scanning pattern followed by the energy beam when the system is operating as programmed to instruct the scanner to operate more in accordance with the second scanning pattern.

16. The method according to claim 1, wherein at least two of the lobes have different shapes.

17. The method according to claim 1, wherein at least two of the lobes have different sizes.

18. A method for heating at least one selected portion of an object, the method including the following steps:
    projecting an energy beam onto a surface of the object so as to produce a primary spot on the surface, and repetitively scanning the beam in two dimensions in accordance with a scanning pattern so as to establish an effective spot on the surface, the effective spot having a two-dimensional energy distribution, and
    displacing the effective spot in relation to the surface of the object to progressively heat the at least one selected portion of the object,
    wherein the scanning pattern comprises a plurality of interconnected curved segments,
    wherein the scanning pattern comprises at least three lobes,
    wherein the scanning pattern comprises curved and straight segments, and
    wherein the scanning pattern does not feature any sharp corners or sharp bends.

19. A method for heating at least one selected portion of an object, the method including the following steps:
    projecting an energy beam onto a surface of the object so as to produce a primary spot on the surface, and repetitively scanning the beam in two dimensions in accordance with a scanning pattern so as to establish an effective spot on the surface, the effective spot having a two-dimensional energy distribution, and
    displacing the effective spot in relation to the surface of the object to progressively heat the at least one selected portion of the object,
    wherein the scanning pattern comprises a plurality of interconnected curved segments,
    wherein the scanning pattern comprises at least three lobes,
    wherein the curved segments are interconnected by straight segments that cross each other at a center of the scanning pattern.

\* \* \* \* \*